United States Patent
Drake et al.

(10) Patent No.: US 10,795,649 B1
(45) Date of Patent: Oct. 6, 2020

(54) CUSTOM CODE BLOCKS FOR A VISUAL PLAYBOOK EDITOR

(71) Applicant: Splunk Inc., San Francisco, CA (US)

(72) Inventors: Allison Drake, San Diego, CA (US); Daniel Trenker, Encinitas, CA (US); David Wayman, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 16/264,594

(22) Filed: Jan. 31, 2019

(51) Int. Cl.
    *G06F 8/34* (2018.01)
    *H04L 29/06* (2006.01)
    *G06F 9/451* (2018.01)
    *G06F 9/54* (2006.01)

(52) U.S. Cl.
    CPC ............... *G06F 8/34* (2013.01); *G06F 9/451* (2018.02); *G06F 9/543* (2013.01); *H04L 63/101* (2013.01)

(58) Field of Classification Search
    CPC .................................... G06F 8/30; G06F 8/34
    See application file for complete search history.

(56) References Cited

U.S. PATENT DOCUMENTS

| | | | | |
|---|---|---|---|---|
| 5,168,441 A | * | 12/1992 | Onarheim | G05B 19/0426 700/17 |
| 5,974,254 A | * | 10/1999 | Hsu | G06F 8/71 714/37 |
| 6,282,699 B1 | * | 8/2001 | Zhang | G06F 8/34 715/967 |
| 7,337,407 B1 | * | 2/2008 | Ogami | G06F 17/5063 703/14 |
| 10,229,251 B1 | * | 3/2019 | Dalessio | G06F 8/60 |
| 2001/0034879 A1 | * | 10/2001 | Washington | G06F 8/34 717/100 |
| 2002/0089538 A1 | * | 7/2002 | Wenzel | G06F 8/34 715/763 |
| 2002/0196282 A1 | * | 12/2002 | Washington | G06F 8/34 715/763 |
| 2005/0039176 A1 | * | 2/2005 | Fournie | G06F 8/34 717/156 |
| 2005/0091602 A1 | * | 4/2005 | Ramamoorthy | G05B 19/0426 715/763 |

(Continued)

OTHER PUBLICATIONS

Rapid7, "Security Orchestration Automation and Response (SOAR) Tools and Solutions" (Year: 2019).*

*Primary Examiner* — Phillip H Nguyen
(74) *Attorney, Agent, or Firm* — Nicholson De Vos Webster & Elliott LLP

(57) ABSTRACT

Techniques are described for enabling users to add custom code function blocks and multi-prompt blocks to customizable playbooks that can be executed by an orchestration, automation, and response (OAR) platform. At a high level, a playbook comprises computer program code and possibly other data that can be executed by an OAR platform to carry out an automated set of actions. A playbook is comprised of one or more functions or codeblocks, where each codeblock contains program code that performs defined functionality when the codeblock is encountered during execution of the playbook of which it is a part. For example, a first codeblock may implement an action that is performed relative to one or more IT assets, another codeblock might filter data generated by the first codeblock in some manner, and so forth.

30 Claims, 18 Drawing Sheets

(56) References Cited

U.S. PATENT DOCUMENTS

| | | | |
|---|---|---|---|
| 2006/0143570 A1* | 6/2006 | Washington | G06F 8/34 715/763 |
| 2007/0089063 A1* | 4/2007 | Breyer | G06F 8/34 715/763 |
| 2007/0283322 A1* | 12/2007 | Hsu | G06F 8/34 717/113 |
| 2008/0205092 A1* | 8/2008 | Sokuza | H02P 29/00 363/34 |
| 2009/0119640 A1* | 5/2009 | Ramsey | G06F 8/34 717/109 |
| 2009/0183094 A1* | 7/2009 | Ramamoorthy | G05B 19/0426 715/763 |
| 2014/0181789 A1* | 6/2014 | Canter | G06F 8/34 717/113 |
| 2018/0367568 A1* | 12/2018 | Martinez | H04L 63/20 |

* cited by examiner

PLAYBOOKS MANAGEMENT INTERFACE 200

OAR Platform

Playbooks | Custom Lists

PLAYBOOKS LIST 202

| Name | Label | Repo | Category | Status |
|---|---|---|---|---|
| Playbook 1 \| Successful Executions: 10 \| Failed Executions 2 \| Last Updated: Jan. 10, 2019<br>This playbook can be used to remediate virus-related incidents at endpoint devices. | events | community | IT ops | active |
| Playbook 2 \| Successful Executions: 2 \| Failed Executions 0 \| Last Updated: Dec. 30, 2018<br>This playbook can be used to geo-locate IP addresses. | events | community | Security | inactive |
| Playbook 3 \| Successful Executions: 50 \| Failed Executions 5 \| Last Updated: Nov. 10, 2018<br>This playbook can be used to quarantine endpoint devices. | events | community | Sample | inactive |
| Playbook 4 \| Successful Executions: 20 \| Failed Executions 0 \| Last Updated: Aug. 8, 2018<br>This playbook can be used to remediate virus-related incidents at endpoint devices. | | private | Sample | active |
| Playbook 5 \| Successful Executions: 0 \| Failed Executions 0 \| Last Updated: Jan. 20, 2019<br>This playbook can be used to restart servers experiencing issues. | campaign | community | | inactive |

< 1 2 3 4 5 >    Show 5

*FIG. 2*

MISSION CONTROL
INTERFACE 1200

OAR Platform      MISSION CONTROL      🔔 admin events ID: 4
[ MEDIUM v ]   SLA: 11 hours remaining | More v
Rainbow

| Activity | Guidance | Timeline | HUD | Artifacts v | Approvals | Reports | Admin v | Set Status | [ New v ] | 🗂 |
|---|---|---|---|---|---|---|---|---|---|---|

1206 Owner [ > ACTION ] [ > PLAYBOOKS ]

Prompts

1202

| OWNER | OWNER TYPE | NAME | START TIME | STATUS |
|---|---|---|---|---|
| admin | User | prompt_1 | 3 mins ago | [ MANAGE ] |
| admin | User | prompt_1 | 43 mins ago | ✓ approved |

Recent Activity admin
> My Multi Prompt
  prompt           43 mins ago
["The IP address is quarantined"]   ↻ ⋯ admin
> My Multi Prompt
  prompt           2 minutes ago
▬▬▭▭   ↻ ✗ ⋯

| Widgets | Notes |
|---|---|

1204

[ MANAGE WIDGETS ]

[ Comment ]

*FIG. 12*

MISSION CONTROL
INTERFACE 1400

OAR Platform     MISSION CONTROL events ID: 4

[MEDIUM ▼]   SLA: 11 hours remaining | More ▼      ✓ Prompt Completed

Rainbow                   Owner [Admin ▼] Set Status [New ▼]   🗔

| Activity | Guidance | Timeline | HUD | Artifacts ▼ | Approvals | Reports | > ACTION | > PLAYBOOKS |

1402

Prompts

| OWNER | OWNER TYPE | NAME | START TIME | STATUS |
|---|---|---|---|---|
| admin | User | prompt_1 | 3 mins ago | ✓ approved |
| admin | User | prompt_1 | 43 mins ago | ✓ approved |

Recent Activity

Widgets   Notes                                    [MANAGE WIDGETS]

43 mins ago   ✎ ⋯   ↻ ⋯ admin
 > My Multi Prompt
 prompt
 ["The IP address is quarantined"]

[Comment]

CAUSE DISPLAY OF A GRAPHICAL USER INTERFACE (GUI) INCLUDING A VISUAL PLAYBOOK EDITOR FOR A CUSTOMIZABLE PLAYBOOK, WHEREIN THE CUSTOMIZABLE PLAYBOOK REPRESENTS COMPUTER PROGRAM SOURCE CODE INCLUDING A COLLECTION OF RELATED FUNCTION BLOCKS THAT DEFINE A SERIES OF OPERATIONS TO BE PERFORMED IN RESPONSE TO IDENTIFICATION OF AN INCIDENT IN AN INFORMATION TECHNOLOGY (IT) ENVIRONMENT, AND WHEREIN THE COLLECTION OF RELATED FUNCTION BLOCKS IS REPRESENTED BY A GRAPH DISPLAYED IN THE VISUAL PLAYBOOK EDITOR 1702

RECEIVE INPUT VIA THE VISUAL PLAYBOOK EDITOR, THE INPUT INCLUDING: FIRST INPUT CAUSING ADDITION TO THE GRAPH OF A NODE REPRESENTING A CUSTOM CODE FUNCTION BLOCK, THE CUSTOM CODE FUNCTION BLOCK ASSOCIATED WITH USER-GENERATED SOURCE CODE TO BE EXECUTED AS PART OF EXECUTION OF THE PLAYBOOK, SECOND INPUT SPECIFYING ONE OR MORE OUTPUT VARIABLES ASSOCIATED WITH THE CUSTOM CODE FUNCTION BLOCK, AND THIRD INPUT CREATING A CONNECTION BETWEEN THE NODE REPRESENTING THE CUSTOM CODE FUNCTION BLOCK AND AT LEAST ONE OTHER NODE OF THE GRAPH REPRESENTING THE PLAYBOOK 1704

CAUSE DISPLAY OF THE NODE REPRESENTING THE CUSTOM CODE FUNCTION BLOCK AS PART OF THE GRAPH DISPLAYED IN THE VISUAL PLAYBOOK EDITOR
1706

CAUSE DISPLAY OF A GRAPHICAL USER INTERFACE (GUI) INCLUDING A VISUAL PLAYBOOK EDITOR FOR A CUSTOMIZABLE PLAYBOOK, WHEREIN THE CUSTOMIZABLE PLAYBOOK REPRESENTS COMPUTER PROGRAM SOURCE CODE INCLUDING A COLLECTION OF RELATED FUNCTION BLOCKS THAT DEFINE A SERIES OF OPERATIONS TO BE PERFORMED IN RESPONSE TO IDENTIFICATION OF AN INCIDENT IN AN INFORMATION TECHNOLOGY (IT) ENVIRONMENT, AND WHEREIN THE COLLECTION OF RELATED FUNCTION BLOCKS IS REPRESENTED BY A GRAPH DISPLAYED IN THE VISUAL PLAYBOOK EDITOR 1802

RECEIVE INPUT VIA THE VISUAL PLAYBOOK EDITOR, THE INPUT INCLUDING: FIRST INPUT CAUSING ADDITION TO THE GRAPH OF A NODE REPRESENTING A MULTI-PROMPT FUNCTION BLOCK TO THE PLAYBOOK, THE MULTI-PROMPT FUNCTION BLOCK ASSOCIATED WITH A PLURALITY OF RESPONSE PROMPTS TO BE DISPLAYED TO A USER IN A SINGLE INTERFACE ELEMENT DURING EXECUTION OF THE PLAYBOOK, WHEREIN A VALUE PROVIDED BY A USER IN RESPONSE TO AT LEAST ONE OF THE PLURALITY OF RESPONSE PROMPTS IS USED BY AT LEAST ONE OTHER FUNCTION BLOCK OF THE PLAYBOOK, AND SECOND INPUT DEFINING AT LEAST ONE CONNECTION BETWEEN THE MULTI-PROMPT FUNCTION BLOCK AND AT LEAST ONE OTHER FUNCTION BLOCK IN THE PLAYBOOK 1804

CAUSE DISPLAY OF THE MULTI-PROMPT FUNCTION BLOCK AS PART OF THE GRAPH DISPLAYED IN THE VISUAL PLAYBOOK EDITOR 1806

*FIG. 18*

CUSTOM CODE BLOCKS FOR A VISUAL PLAYBOOK EDITOR

RELATED APPLICATIONS

Any and all applications for which a foreign or domestic priority claim is identified in the Application Data Sheet as filed with the present application are incorporated by reference under 37 CFR 1.57 and made a part of this specification.

FIELD

At least one embodiment of the present disclosure pertains to computing environment security, operational administration, and automation and, in particular, to the creation of digital playbooks used to automate operations performed at disparate information technology (IT) related assets and related to incidents within a computing environment.

BACKGROUND

An increasing number of security threats and operational issues exist in modern IT environments. These threats and operational issues include, for example, viruses and malware that attack various types of computing devices, sophisticated cyberattacks that attempt to gather data and other information from cloud- or server-based infrastructures, software bugs and hardware failures associated with IT components, among a wide range of other events that can disrupt IT operations. Furthermore, a typical IT infrastructure managed by a business or other entity includes many different types of computing devices, applications, and services that are used to support operations, such as data storage, networking, web sites and application services, and the like. To protect complex IT infrastructures, system administrators typically employ a wide array of devices and applications including, for example, various antivirus, encryption, firewall, and other IT operations applications.

BRIEF DESCRIPTION OF DRAWINGS

Various embodiments in accordance with the present disclosure will be described with reference to the drawings, in which:

FIG. 2 illustrates an example interface used to manage digital playbooks associated with an OAR platform according to some embodiments.

FIG. 12 illustrates an example of a "mission control" interface used to view status information related to playbook executions according to some embodiments.

FIG. 14 illustrates an example of a mission control interface after a user completes an assigned multi-prompt according to some embodiments.

FIG. 17 is a flow diagram illustrating operations of a method for providing a visual playbook editor used to create playbooks for an OAR platform, the visual playbook editor including the ability to add custom code function blocks to a playbook, according to some embodiments FIG. 18 is a flow diagram illustrating operations of a method for providing a visual playbook editor used to create playbooks for an OAR platform, the visual playbook editor including the ability to add multi-prompt function blocks to a playbook, according to some embodiments.

DETAILED DESCRIPTION

Figure 1:
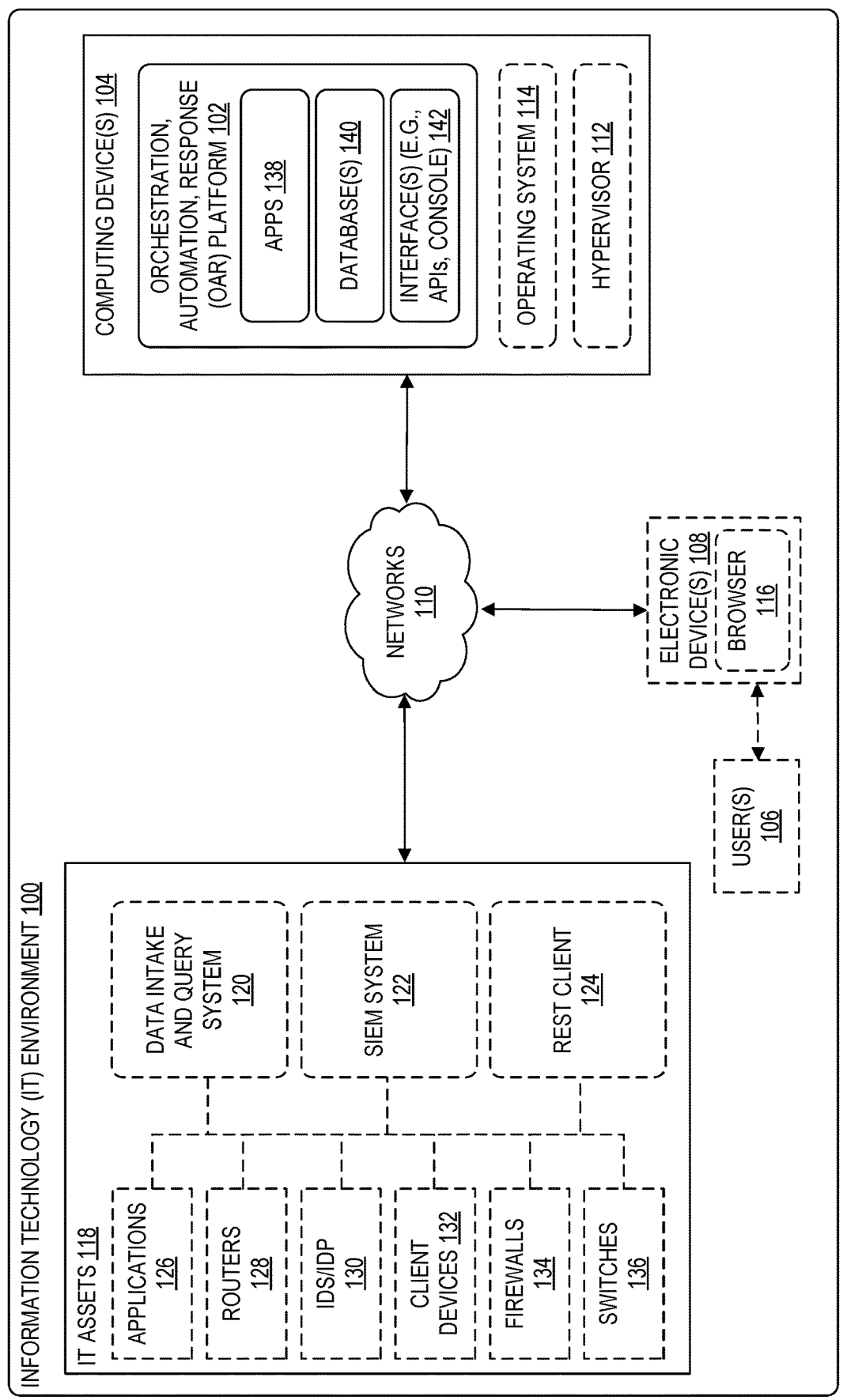
FIG. 1 is a block diagram illustrating an example networked computing environment including an orchestration, automation, and response (OAR) platform according to some embodiments.

Embodiments are described herein according to the following outline:

1.0. General Overview
2.0. Orchestration, Automation, and Response (OAR) Platform Overview
   2.1. Data Intake
   2.2. Actions
   2.3. Apps
   2.4. Assets
   2.5. Playbooks
      2.5.1. Playbook Management
      2.5.2. Playbook Creation and Configuration
      2.5.3. Playbook Execution
3.0. Functional Overview
   3.1. Custom Code Blocks
   3.2. Multi-Prompt Blocks 1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments such as servers, sensors, routers, mobile devices, Internet of Things (IoT)

devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. To reduce the size of the potentially vast amount of machine data that may be generated, many of these tools typically pre-process the data based on anticipated data analysis needs. For example, pre-specified data items may be extracted from the machine data and stored in a database to facilitate efficient retrieval and analysis of those data items at search time. However, the rest of the machine data typically is not saved and is instead discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although some of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events." An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, and so forth.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as by Internet Protocol (IP) address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

2.0. Orchestration, Automation, and Response (Oar) Platform Overview

As indicated above, the management of modern IT environments often involves managing a large number of devices and software operating within such environments. A system administrator of even a modestly-sized IT environment, for example, might be responsible for managing numerous servers, endpoint devices, firewalls, and various types of software products and services running on top of those devices. Systems such as the SPLUNK® ENTERPRISE system, as well as other various SIEM, security, and IT operations applications, provide ways to organize, analyze, diagnose, and provide intelligence related to these components of users' IT environments.

The management of IT environments often further includes responding to a wide variety of incidents that may occur over time and which may be indicated or derived from analysis of data generated by IT environment components, as described above. Such incidents can include security-related incidents (for example, viruses, network issues, etc.), IT component-related incidents (for example, hardware failures, software bugs, etc.), and any other events that potentially impact operation of an IT environment. These incidents can be flagged, and information related to the incidents may be provided to an administrator or other user to be analyzed for a possible solution. Once a possible solution is identified, the process for remediating such incidents can involve interacting with one or several components within the IT environment. In response to identifying a security-related issue involving an endpoint device, for example, a system administrator might use security software to quarantine the endpoint device, interact with a firewall to update network settings, among any number of other possible operations.

The ability to readily respond to incidents in an IT environment can be aided by using an orchestration, automation, and response (OAR) platform, such as the SPLUNK® PHANTOM® system. An OAR platform generally enables users to connect disparate collections of security and IT applications in users' IT environments and to automate tasks typically performed manually by system administrators and other users in response to identification of various types of IT-related incidents.

FIG. 1 is a block diagram illustrating an example networked computing environment including an OAR platform according to some embodiments. In some embodiments, an OAR platform 102 operates in a networked IT environment 100 and comprises one or more software components executed by one or more electronic computing devices 104. The computing devices 104 generally can be hosted at an on-premises or cloud-based computing environment, or a combination thereof, such that the OAR platform 102 can be accessed by users 106 and used to interact with components of an organization's computing infrastructure. Users 106 using one or more electronic device(s) 108 (which may be part of or separate from the IT environment 100) can interact with the OAR platform 102 via one or more networks 110. Networks 110 broadly represent one or more local area networks (LANs), wide area networks (WANs), cellular networks (e.g., Long-Term Evolution (LTE), High Speed Packet Access (HSPA), 3G, and other cellular technologies), and networks using any of wired, wireless, terrestrial microwave, or satellite links, and may include the public internet. Users 106 may interact with an OAR platform 102 via one or more interfaces 142, such as through use of application programming interface (API) calls, via a console implemented as a website or application, etc.

In some embodiments, some or all the computing devices 104 and systems upon which an OAR platform 102 operates may rely upon virtualization techniques. These virtualization technologies may include virtual machines (VMs) using a guest operating system 114 that operates using a hypervisor 112, where the hypervisor 112 itself may or may not further operate on top of an underlying host operating system. The virtualization technologies may additionally or alternatively include use of containers that may or may not operate in a VM, software that executes on computing device 104 hardware without an underlying hypervisor or other virtualization technology, or any other combination thereof.

In some embodiments, an OAR platform 102 can be deployed as a virtual appliance at one or more computing devices 104 managed by an organization using the OAR platform 102. A virtual appliance, for example, may comprise a VM image file that is pre-configured to run on a hypervisor 112 or directly on the hardware of a computing device 104 and that comprises a pre-configured operating system 114 upon which the OAR platform 102 executes. In other embodiments, the OAR platform 102 can be provided and installed using other types of standalone software installation packages or software package management systems. Depending on the implementation and user preference, an OAR platform 102 optionally can be configured on a stand-alone server or in a clustered configuration across multiple separate computing devices 104. In other embodiments, an OAR platform 102 can be hosted on computing devices 104 managed by an entity that is separate from the users 106 and provided to users 106 as a service (for example, as a service of a cloud-based service provider).

In some embodiments, a user initially configures an OAR platform 102 using a virtual console screen or other interface of a VM hosting the OAR platform 102, for example, to create and configure root and user accounts, configure network settings, and perform other possible configurations. Once a virtual appliance hosting an OAR platform 102 is associated with an IP address and is reachable via a network 110, users 106 can access various interfaces of the OAR platform 102, including a web-based console. For example, users 106 can use a web browser 116 or other application to navigate to the IP address or hostname associated with the OAR platform 102 to access console interfaces used to interact with various aspects of the platform.

An IT environment 100 further includes any number of IT assets 118, for example, as part of a corporate network or other environment with which one or more users 106 are associated. In an embodiment, each of these IT assets 118 can serve as sources of incident data to an OAR platform 102, an asset upon which actions can be performed by the OAR platform 102, or both. The IT assets 118 can include various types of computing devices, software applications, and services including, but not limited to, a data intake and query system 120 (which itself can ingest and process machine data generated by other IT assets 118), a SIEM system 122, a REST client 124 that obtains and/or generates incident data based on the activity of other IT assets 118, software applications 126 (including operating systems, databases, web servers, etc.), routers 128, intrusion detection systems and intrusion prevention systems (IDS/IDP) 130, client devices 132 (for example, servers, desktop computers, laptops, tablets, etc.), firewalls 134, and switches 136. These IT assets 118 may execute upon any number separate computing device(s) and systems within the IT environment 100.

During operation, a data intake and query system 120, SIEM system 122, REST client 124, or other system components or combinations thereof, obtain operational, performance, and security data from other IT assets 118, analyze the data, and optionally identify potential IT-related incidents and send data indicating such incidents to the OAR platform 102. Once a data intake and query system 120 identifies a possible security threat or other IT-related incident based on data ingested by the data intake and query system 120, for example, data representing the incident can be sent to the OAR platform 102 (for example, formatted as JavaScript Object Notation (JSON) data or using other possible data formats). As described in more detail herein, the OAR platform 102 obtains and analyzes such incident data to determine possible actions to perform to remediate or otherwise respond to such incidents. These actions can include default actions that can be initiated and performed within the IT environment 100 without interaction from an administrator or other user and can further include providing suggested actions to one or more users 106. Once the suggested actions are determined, for example, these actions can be presented in an administration console or other interface accessible to users 106. Based on the suggested actions, a user 106 can select one or more particular actions to be performed and the OAR platform 102 can carry out the selected actions within the IT environment 100.

In some embodiments, to execute actions responsive to identified incidents, an OAR platform 102 uses a unified security language to perform actions across a variety of hardware and software products, applications, and services. To execute a command specified using the unified language, for example, the OAR platform 102 uses one or more apps 138 to translate the commands into the one or more processes or languages necessary to implement the action at one or more particular IT assets 118. For example, a user 106 might provide input requesting the OAR platform 102 to remove an identified malicious process from multiple computing systems in the IT environment 100, where two or more of the computing systems are associated with different software configurations (for example, different operation systems or operating system versions). Accordingly, the OAR platform 102 translates the command from the administrator into the necessary processes to remove each instance of the malicious process on the varying computing systems.

In some embodiments, an OAR platform 102 enables users to automate actions or series of actions by creating digital "playbooks" that can be executed by the OAR platform 102. At a high level, a playbook is a customizable computer program that can be executed by an OAR platform 102 to automate a wide variety of possible operations related to an IT environment 100. These operations—such as quarantining devices, modifying firewall settings, restarting servers, and so forth—are typically performed by various security products by abstracting product capabilities using an integrated "app model." Additional details related to operation of the OAR platform 102 and use of digital playbooks are provided elsewhere herein.

2.1. Data Intake

The operation of an OAR platform 102 generally begins with the ingestion of data related to various types of incidents involving one or more IT assets 118 of an IT environment 100. In one embodiment, users 106 configure an OAR platform 102 to obtain, or "ingest," data from one or more defined data sources, where such data sources can be any type of computing device, application, or service that supplies information that users may want to store or act upon. As indicated above, examples of data sources include, but are not limited to, a data intake and query system 120 such as the SPLUNK® ENTERPRISE system, a SIEM system 122, a REST client 124, applications 126, routers 128, intrusion detection systems (IDS)/intrusion prevention systems (IDP) systems 130, client devices 132, firewalls 134, switches 136, or any other source of data identifying potential incidents in an IT environment. Some of these data sources may themselves collect and process data from various other data generating components such as, for example, web servers, application servers, databases, firewalls, routers, operating systems, and software applications that execute on computer systems, mobile devices, sensors, Internet of Things (IoT) devices, etc. The data generated by the various data sources can be represented in any of a variety of data formats.

In an embodiment, data ingested from configured data sources is represented in the OAR platform 102 by "containers." A container is a structured representation of an incident or other type of data ingested from a data source and that can be used throughout the OAR platform 102. In some embodiments, an OAR platform 102 can be configured to create and recognize different types of containers depending on the corresponding type of data ingested, such as "incident containers" for IT-related incidents, or "security event containers" for security-related incidents, and so forth. A container can further include any number of "artifacts," where each artifact represents an item of data associated with the container. For example, a container used to represent data ingested from an anti-virus service and representing security-related incidents may include artifacts indicating a name of the virus, an associated hash value, a file path on the infected endpoint, and so forth.

In an embodiment, the OAR platform 102 stores various data related to its operation, including container data created based on data ingested from IT assets, playbook data, user account settings, configuration data, and so forth, in one or more database(s) 140. These database(s) 140 may operate on a same computer system as the OAR platform 102 or at one or more separate database instances.

In some embodiments, an OAR platform 102 enables users to configure an instance of the platform to support multi-tenancy. A multi-tenant configuration, for example, can enable users of a security team to manage assets associated with multiple independent third-party organizations for which the security team is responsible while maintaining data separation and security among the configured assets and data of each organization. Users and user teams can thus use this feature to perform incident response for multiple third-party organizations on one instance of the OAR platform 102 and using only a single login and permissions configuration.

In an embodiment, users can create custom data sources using a REST client 124. For example, a REST client can be configured to monitor one or more IT assets 118 for incidents and use APIs 142 provided by the OAR platform 102 to create, update, and remove data from an OAR platform 102 corresponding to the incidents.

2.2. Actions

In an embodiment, the OAR platform 102 defines many different types of "actions," which are high-level, vendor- and product-agnostic primitives that can be used throughout the OAR platform 102. At a high level, actions represent simple and user-friendly verbs that are used to execute actions in playbooks and manually through other user interfaces of the OAR platform 102. In general, a same action defined by the OAR platform 102 can be carried out on assets associated with different vendors and/or configurations, where the translation of an action for use at a particular asset is performed by various "apps" of the platform, as described below. Examples of actions that may be defined by an OAR platform 102 include, for example, "get process dump," "block IP address," "suspend VM," "terminate process," etc.

2.3. Apps

In an embodiment, an OAR platform 102 enables connectivity with various IT assets 118, including those from various third-party IT and security technologies, and the ability to execute actions at those assets via "apps" 138. In general, an app 138 represents program code that provides an abstraction layer (e.g., via a library, API, or other interface) to one or more of hundreds of possible IT and security-related products and services, and which exposes lists of actions that are supported by those products and services. Each app 138 may also define which types of assets that the app can operate on.

As one example, an OAR platform 102 may be configured with an app 138 that enables the platform to communicate with a VM product provided by a third-party vendor. In this example, the app for the VM product enables the platform 102 to take actions relative to VM instances within a user's IT environment, including starting and stopping the VMs, taking VM snapshots, analyzing snapshots, and so forth. In order for the app to communicate with individual instances, the app 138 can be configured with login credentials, hostname or IP address, and so forth, for each instance with which communication is desired. Other apps 138 may be available for VM products from other third-party vendors, where those apps are configured to translate some or all of the same actions that are available with respect to the first type of VM product. In general, apps 138 can enable interaction with virtually any type of IT asset 118 in an IT environment and can be added and updated over time to support new types of assets.

2.4. Assets

In an embodiment, IT assets 118 are instances of physical or virtual components within an organization with which an OAR platform 102 communicates (for example, via apps as described above). Examples of IT assets 118 include, but are not limited to, servers, endpoint devices, routers, and firewalls. In the context of an OAR platform 102, an IT asset 118 is represented by data identifying the asset, including information used to communicate with the device or service (for example, an IP address, automation service account, username, password, and so forth). In an embodiment, one or more IT assets 118 can be configured as a source of incident information that is ingested by an OAR platform 102. The types of IT assets 118 that can be configured in the OAR platform 102 may be determined in some cases based on what apps 138 are installed, as described above. In some embodiments, automated actions can be configured with respect to various IT assets 118 using playbooks, described in more detail elsewhere herein.

2.5. Playbooks

In some embodiments, the operation of an OAR platform 102 includes the ability to execute customizable playbooks. At a high level, a playbook comprises computer program code and possibly other data that can be executed by an OAR platform 102 to carry out an automated set of actions. In one embodiment, a playbook is comprised of one or more functions or codeblocks, where each codeblock contains program code that performs defined functionality when the codeblock is encountered during execution of the playbook of which it is a part. For example, a first codeblock may implement an action that is performed relative to one or more IT assets 118, another codeblock might filter data generated by the first codeblock in some manner, and so forth. A playbook is further associated with a control flow that defines an order in which the codeblocks of the playbook are executed, where a control flow may vary at each execution depending on particular input conditions.

The OAR platform 102 described herein provides graphical user interfaces (GUIs) including a visual playbook editor that allows users to visually create and modify playbooks. Using a visual playbook editor GUI, for example, users can codify a playbook by creating and manipulating a displayed graph including nodes and edges, where each of the nodes in the graph represents a codeblock that performs one or more defined operations during execution of the playbook, and where the edges represent the control flow among the playbook's codeblocks. In this manner, users can craft playbooks that perform complex sequences of operations without having to write some or any of the underlying code. The visual playbook editor interfaces further enable users to supplement or modify the automatically generated code by editing the code associated with a visually-designed playbook, as desired.

2.2.1. Playbooks Management

In an embodiment, an OAR platform 102 provides one or more playbook management interfaces that enable users to locate and organize playbooks associated with a user's account. A playbook management interface, for example, can display a list of playbooks that are associated with a user's account and further provide information about each playbook such as, for example, a name of the playbook, a description of the playbook's operation, a number of times the playbook has been executed, a last time the playbook was executed, a last time the playbook was updated, tags or labels associated with the playbook, a repository at which the playbook and the associated program code is kept, a status of the playbook, and so forth.

FIG. 2 illustrates an example playbook management interface according to some embodiments. As shown in FIG. 2, the playbook management interface 200 includes a playbook list 202. As indicated above, a playbook list 202 includes several columns indicating information about each playbook including, for example, a name of the playbook, one or more labels associated with each playbook, a repository at which the playbook is kept, a category associated with each playbook, and a status of the playbook. In an embodiment, a user can also use interface elements 204 to sort the list of displayed playbooks, refresh the playbook list, download an exported copy of one or more playbooks, or create a new playbook, among other possible operations. In an embodiment, a user can also provide input selecting a playbook to view in the visual playbook editor so that the user can modify the selected playbook, if desired.

2.5.2 Playbook Creation and Configuration

In an embodiment, users can create a new digital playbook starting from a playbook management interface, as described in reference to FIG. 2, or using another interface provided by the OAR platform 102. Using the playbook management interface 200, for example, a user can select the "create new playbook" interface element from interface elements 204. Once a user has provided input requesting the creation of a new playbook, the OAR platform 102 displays a visual playbook editor interface including a graphical canvas on which users can add nodes representing operations to be performed during execution of the playbook, where the operations are implemented by associated source code that can be automatically generated by the visual playbook editor, and connections or edges among the nodes defining an order in which the represented operations are performed upon execution.

Figure 3:
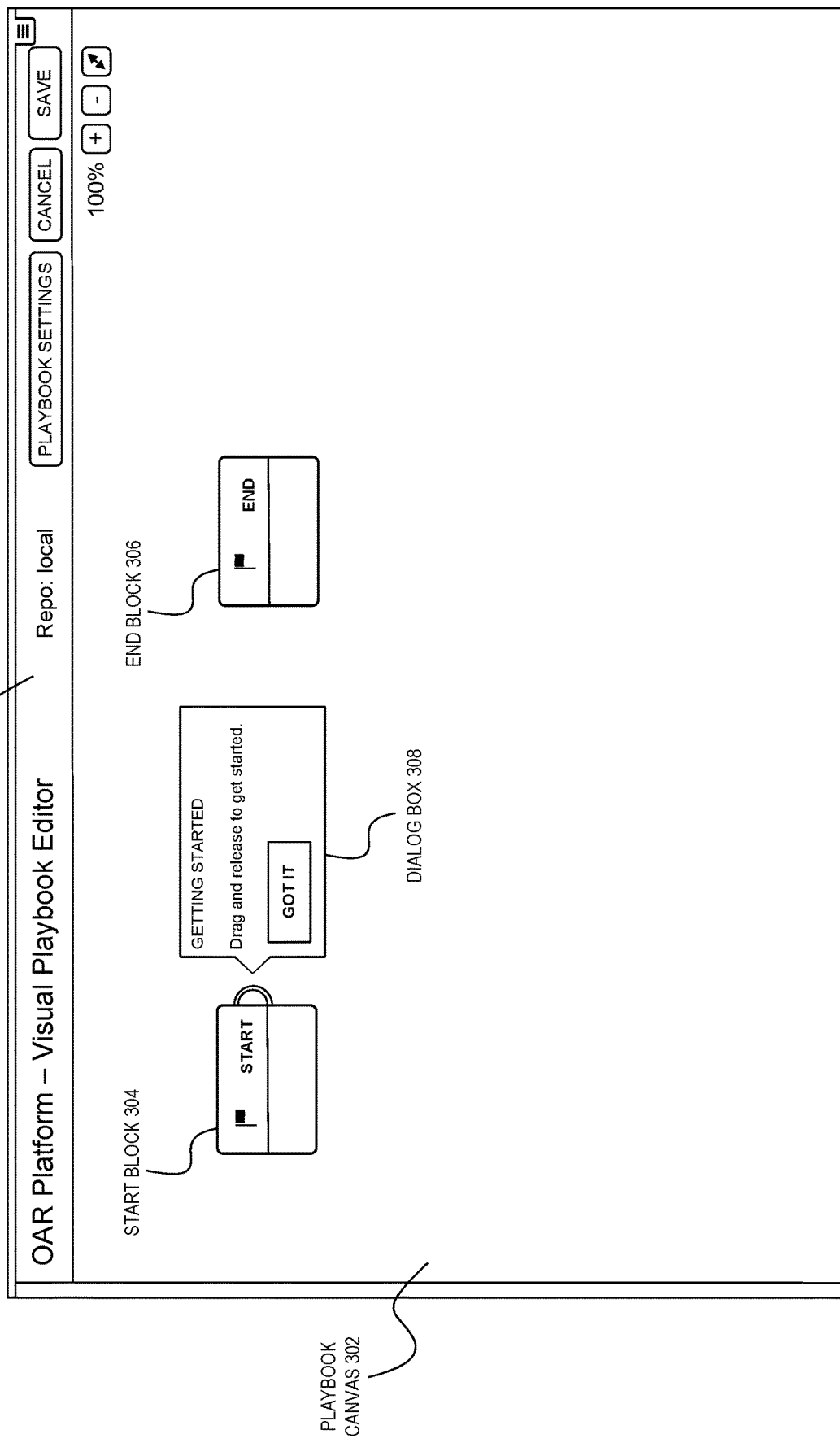
FIG. 3 illustrates an example visual playbook editor interface used to create a digital playbook according to some embodiments.

FIG. 3 illustrates a visual playbook editor canvas that can be used to visually design a playbook. As illustrated in FIG. 3, a visual playbook editor interface 300 includes a playbook canvas 302 initially including two nodes corresponding to a start block 304 and an end block 306, respectively, where those nodes represent a start and end point for execution of the playbook being designed. In the illustrated example, the visual playbook editor interface 300 further displays an example dialog box 308 instructing a user to select the start block 304 and to create an edge or connection originating from the start block 304 to add a new block to the playbook. As described in more detail below, the visual playbook editor interface 300 enables users to add various types of blocks to a playbook including, for example, playbook blocks, decision blocks, filter blocks, action blocks, format blocks, prompt blocks, task blocks, and API blocks.

In an embodiment, one type of block that can be added to a playbook is an action block. Once an action block is added to a playbook, the visual playbook editor interface can guide the user in selecting an action to be performed when the action block is encountered during execution of the playbook. The action block can optionally be further configured using various items of data accessible to the action block including, for example, data stored as part of a container and associated artifacts as well as other output variables generated by other playbook blocks. For example, if a user adds an action block that performs the operation of geolocating an IP address, a user may configure the action block to use an IP address corresponding to a selected artifact of a container that initiated the playbook's execution, or based on an IP address obtained by an upstream block using other processes.

In an embodiment, another type of block that a user can add to a playbook is a prompt block. A prompt block is generally used to add user interaction to a playbook by causing information to be requested from one or more users at a particular point during execution of the playbook. The information requested and provided by a user can be used by other downstream blocks of the playbook. For example, a playbook might include an action block that detects the presence of potentially malicious IP addresses, a serially-connected prompt block that presents information to a user about the detected potentially malicious IP address and requests a yes/no response from the user indicating whether the IP address should be blocked, followed by another serially-connected action block that either blocks the IP address at a firewall or not depending on the input received from a user in response to the prompt block.

In an embodiment, a prompt block is associated with various properties that can be configured by a user using a visual playbook editor including, for example, configurations indicating a prompt approver, a required response time, a message prompt, and a response type. The assignment of a prompt approver indicates an individual user or user role (e.g., administrator, engineer, manager) that is to receive the prompt to be acted upon during execution of the corresponding playbook. A required response time indicates an amount of time that an assigned approver or set of approvers have to complete the prompt, for example, by accessing the prompt and providing any requested information and/or performing actions specified by the prompt. A message prompt is information that is displayed to a user when the user accesses an assigned prompt (for example, a message prompt can be presented as part of a GUI interface element displayed to a user accessing an assigned prompt). A response type indicates a type of acceptable response that can be provided by a user to successfully complete the prompt (for example, a yes/no response, a numerical value response, a text-based response, a response from an enumerated list of options, etc.).

In some embodiments, a user accesses a prompt that has been generated for the user during execution of a playbook via a notification presented in a "mission control" or other type of interface of the OAR platform 102. In response to a user accessing an assigned prompt (for example, by providing input selecting a notification indicating the existence of the prompt), the OAR platform 102 causes display of an interface element that includes a message indicating what information is being requested from the user. A user assigned a prompt can either complete the prompt (that is, access the prompt and provide any requested data), delegate the prompt to a different user, or allow the deadline for responding to the prompt to time out. A prompt is successfully completed when either the designated user, or a user to whom the prompt is delegated, completes the prompt. If a prompt is assigned to a group of users, a prompt can be successfully completed when either at least one user of the group completes the prompt, or when all users of the group complete the prompt, depending on how the prompt is configured.

In an embodiment, yet another type of function block that can be added to a playbook is a task block. A task block is generally configured to send a message to a user or group of users to be acknowledged by the users. A task block can be further configured by specifying an approver (that is, a user or user role to whom the task is sent), a response deadline (for example, expressed in minutes from the time at which the task is generated), a message to be displayed to the user(s), among other possible configurations.

In an embodiment, yet another type of block that can be added to playbooks in a visual playbook editor is a decision block. A decision block generally can be used to control program flow associated with the playbook. For example, during execution of a playbook, a decision block can be used to determine whether the execution flow proceeds next to a block A or to a block B (or block C, and so forth) depending on the outcome of one or more logical conditions defined by the decision block. These logical conditions, for example, can be based on comparisons involving artifact data, container properties, date functions, action results, among other possible types of input data. The use of a decision block in a playbook, for example, is conceptually similar to an if-then conditional statement found in high-level programming languages.

In an embodiment, yet another type of block that can be included in a playbook is an API block. An API block can be used, for example, to set various parameters associated with an incident container upon which the playbook is executing or to interact with the OAR platform 102 in other ways supported by an associated API. For example, an API block can be used to set a severity level associated with an incident container, to indicate that the incident container is resolved, to associate a label with the incident container, add a comment to the container, among other possible operations.

In an embodiment, the creation of a graph representing a playbook includes the creation of connections between function blocks, where the connections are represented by edges that visually connect the nodes of the graph representing the collection of function blocks. These connections among the playbook blocks indicate a program flow for the playbook, defining an order in which the operations specified by the playbook blocks are to occur. For example, if a user creates a connection that links the output of a block A to the input of a block B, then block A executes to completion before execution of block B begins during execution of the playbook. In this manner, output variables generated by the execution of block A can be used by block B (and any other subsequently executed blocks) during playbook execution.

In an embodiment, users can create connections that link function blocks of a playbook in parallel. For example, a user can create a connection that links the output of a function block A to the input of a function block B and separately to the input of a function block C. In this example, the OAR platform 102 can execute the operations defined by function blocks B and C in parallel, although the exact ordering of the execution may not be guaranteed. For some playbooks, the execution of two or more function blocks in parallel may provide a performance benefit compared to executing the function blocks serially.

In an embodiment, the visual representation of a playbook in a visual playbook editor, comprising a collection of nodes and edges, can be modified over time. Users can provide input via the visual playbook editor interface, for example, to rearrange the location of and connection between nodes in the graph and the visual playbook editor can route existing connections among the nodes accordingly such that an easily understandable visual representation is provided. In some embodiments, multiple nodes can be selected and moved around the canvas as a group.

2.5.3. Playbook Execution

Once a user has codified a playbook using a visual playbook editor or other interface, the playbook can be saved (for example, in a database 140 and in association with one or more user accounts) and run by the OAR platform 102. As illustrated in the example playbooks above, a playbook includes a "start" block that is associated with source code that begins execution of the playbook. More particularly, the OAR platform 102 executes the function represented by the start block for a playbook with container context comprising data about the incident upon which the playbook is executed, where the container context may be derived from input data from one or more configured data sources. A playbook can be executed manually, for example, in response to a user providing input requesting execution of the playbook, or playbooks can be executed automatically in response to the OAR platform 102 obtaining input events matching certain criteria. In embodiments where the source code associated with a playbook is based on an interpreted programming language (for example, such as the Python programming language), the OAR platform 102 can execute the source code represented by the playbook using an interpreter and without compiling the source code into compiled code. In other examples, the source code associated with a playbook can first be compiled into byte code or machine code and executed by the OAR platform 102.

3.0. Functional Overview

As indicated above, some OAR platforms, such as the SPLUNK® PHANTOM® platform, include a visual playbook editor that enables users to create and configure executable playbooks using a GUI to manipulate visual representations of playbooks. In some embodiments, a visual playbook editor visually represents a playbook using a graph including a set of nodes, each representing an individual function or other portion of the source code represented by the playbook, and connections between the nodes representing a flow of control among the defined functions of the playbook. Users can selectively add, modify, and remove nodes, each representing various types of function blocks, in a playbook depending on the actions that a user desires the playbook to perform. As described elsewhere herein, examples of blocks that can be included in a playbook include action blocks, decision blocks, task blocks, API blocks, among others.

3.1. Custom Code Blocks

Because the nodes of a visually-designed playbook represent executable code that performs operations to automate tasks that a user desires to have carried out, it sometimes desirable for users to create custom modifications to the code associated with a playbook. For example, a user may desire to modify or supplement the operations that are performed by one or more pre-defined function blocks for particular use cases relevant to the user. In some embodiments, a visual playbook editor enables users to make such modifications to the source code associated with the function block of a playbook and further enables users to insert code into global sections of a playbook's associated source code.

Figure 4:
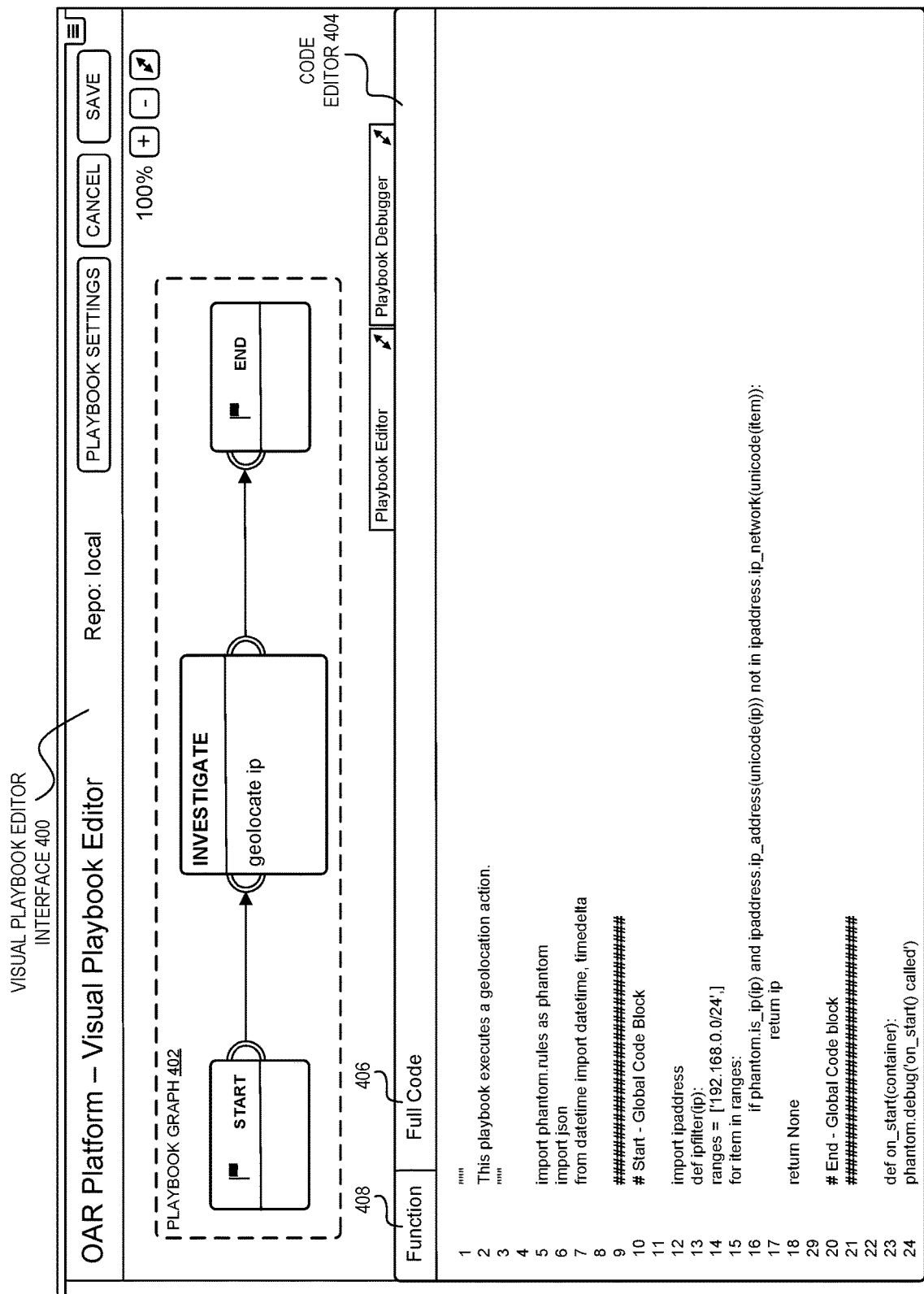
FIG. 4 illustrates an example of editing source code associated with a block of a playbook using a visual playbook editor according to some embodiments.

FIG. 4 illustrates an example visual playbook editor interface that enables users to modify source code associated with a visually-designed playbook. In the example visual playbook editor interface 400 shown in FIG. 4, a user has provided input indicating a desire to edit the source code associated with the playbook graph 402. In response to receiving such input, the visual playbook editor interface 400 displays a code editor section 404 that shows the source code associated with the displayed playbook graph 402 and further enables a user to modify the source code. Users can optionally cause display of the source code associated with an entire playbook (for example, by selecting the "Full Code" tab 406), or the source code associated with only one or more selected nodes in a playbook (for example, by selecting the "Function" tab 408). The ability to view the full source code associated with a playbook, for example, can enable users to edit a global section of the playbook. Modifications to a global section of a playbook's source code can be used, for example, to import additional code libraries or to implement other functionality that is not specific to a particular function block of the playbook.

Once a user customizes source code associated with one or more playbook function blocks as described above, however, the visual playbook editor is not able determine the effects of the user's custom changes to the code and may disable the user's ability to modify the block using the visual playbook editor. For example, when the visual playbook editor is used to configure a block without any custom code changes, the visual playbook editor automatically generates the underlying source code corresponding to the user's configurations made to the block via the visual playbook editor. However, if a user has added custom code to a playbook block and were to then subsequently use the visual playbook editor to make further changes, the visual playbook editor would overwrite the user's custom code since it cannot be aware of how the user's custom code integrates with the code it autogenerates. Thus, once a user has added custom code to a block, the visual playbook editor typically disables the user's ability to further modify the block via the interface to avoid such issues.

Furthermore, an existing visual playbook editor is generally unable to provide a useful representation of custom code added to a playbook block or to the global section of the playbook in a displayed playbook graph. For example, because the visual playbook editor is unable to determine the exact nature of the user's custom code, the playbook editor is unable to visually represent the functionality of the custom code in a playbook graph. Thus, users viewing a playbook in the visual playbook editor are typically unable to visually understand how custom functionality added to a playbook interacts with other functionality represented by the portions of the playbook displayed in the visual playbook editor.

According to embodiments described herein, to better facilitate the addition of custom code to a playbook, a visual playbook editor enables users to add "custom code" function blocks to playbooks, where a custom code function block is associated with user-generated source code that is part of a playbook. Once added to a playbook, a visual playbook editor of an OAR platform 102 displays a node that visually identifies custom code function blocks as part of a playbook, and further enables users to create connections between custom code function blocks and other function blocks of a playbook. The connections between a custom code function block and other playbook blocks can be associated with input parameters and output variables usable by the custom code function block and other downstream function blocks of a playbook. Among other benefits, a custom code function block enables the full integration of users' custom code into the visual representation of playbooks by a visual playbook editor, allowing users to readily understand the relationship of custom code to other parts of the playbook of which it is a part. Furthermore, the visual representation of such custom code blocks enables users to easily reuse the blocks within the same playbook or across different playbooks.

Figure 5:
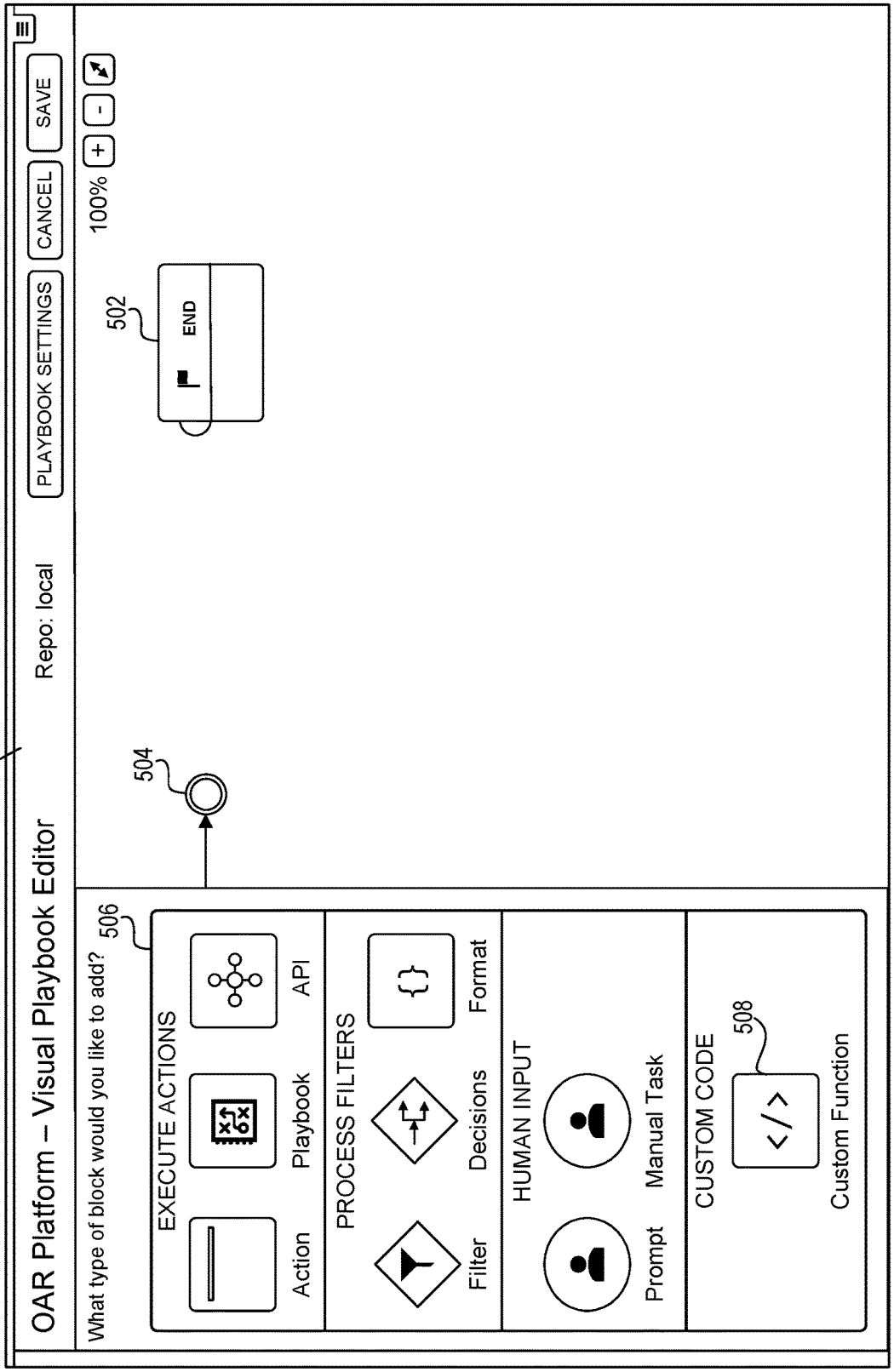
FIG. 5 illustrates an example of adding a custom code block to a playbook using a visual playbook editor according to some embodiments.

FIG. 5 illustrates an example of adding a custom code block to a visually-designed playbook using a visual playbook editor according to some embodiments. As shown in FIG. 5, a visual playbook editor interface 500 includes an initial playbook graph including a start block (not shown) and an end block 502. In this example, a user has created a connection 504 originating from the start block indicating a desire to add a function block to the playbook. Based on this input, the visual playbook editor interface 500 has displayed a function block selection panel 506 displaying various types of function blocks that can be added to the graph such as, for example, an action block, a playbook block, an API block, a filter block, etc.

In an embodiment, the types of blocks that a user can add to a playbook in the visual playbook editor interface 300 include a custom code function block, represented by the selectable custom code function block icon 508 in the function block selection panel 506. In response to user selection of the icon 508, a new custom code function block is added to the playbook in the visual playbook editor interface 500 and available for further modification as desired by the user. For example, a user can further specify one or more input parameters and/or output variables to be associated with the custom code function block, and further provide the user-generated source code to be associated with the custom code function block, as described below.

Figure 6:
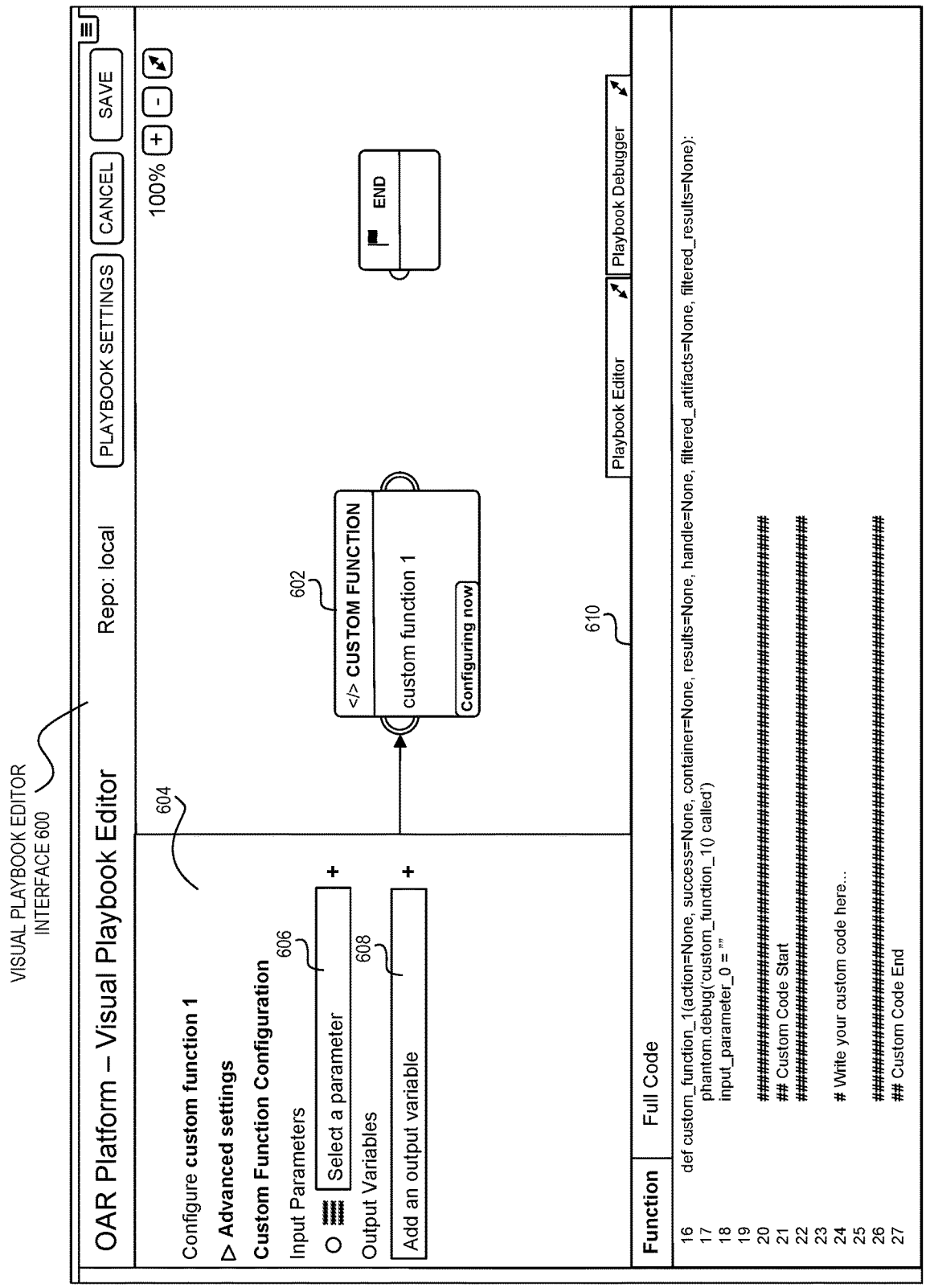
FIG. 6 illustrates an example of modifying a custom code block added to a playbook using a visual playbook editor according to some embodiments.

FIG. 6 illustrates the configuration of a custom code function block in a visual playbook editor according to some embodiments. As shown, the visual playbook editor interface 600 includes a custom code function block 602 which, for example, may have be added based on selection of a custom code function block from the selection panel 506 in FIG. 5. The visual playbook editor interface 600 further illustrates a custom code function block settings panel 604. The custom code function block configuration panel 604 enables users to configure input parameters associated with the selected custom code function block 602 (for example, using the interface elements 606) and to specify one or more output variables (for example, using the interface elements 608), among other possible configurations. FIG. 6 further illustrates a code editor panel 610 that enables users to modify the custom code associated with the custom code function block 602.

As indicated above, a custom code function block can be associated with user-generated code, the output of which can be used by downstream function blocks in a playbook. During execution of the playbook, for example, one or more output variables associated with a custom code function block can be saved to global state associated with the playbook's execution and can be used by other blocks by referring to a name for the output variable(s). In some embodiments, the visual playbook editor allows users to create a custom name for output variables associated with a custom code function block, where a custom variable name can be used by other function blocks to refer to the output variable.

Figure 7:
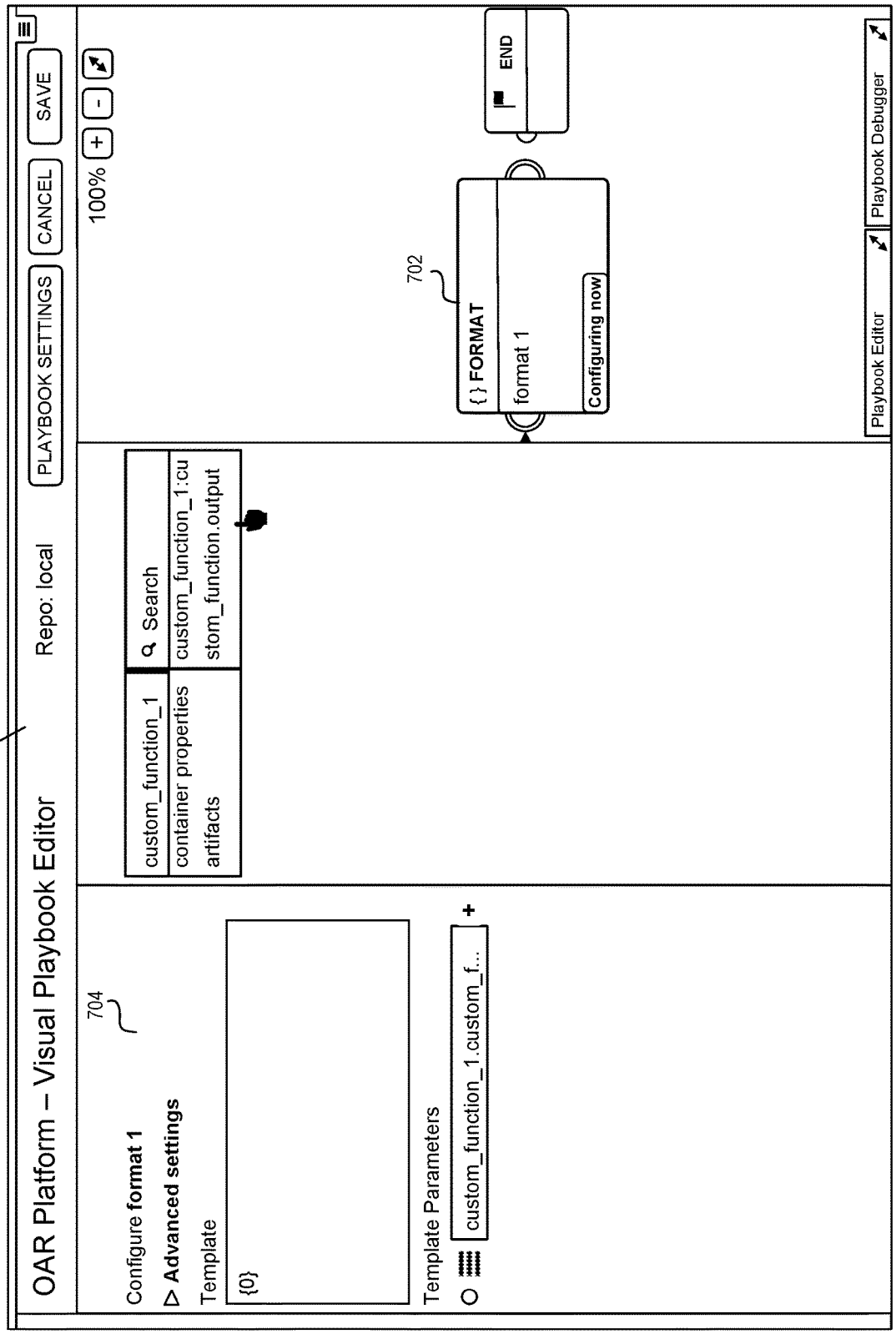
FIG. 7 illustrates an example of referencing a custom code block output variable at another block of the playbook using a visual playbook editor according to some embodiments.

FIG. 7 illustrates an example of a downstream block in a playbook using an output variable generated by an upstream custom code function block according to some embodiments. In the example of FIG. 7, using the visual playbook editor interface 700, a user has selected a format block 702 that is downstream from a custom code function block and is using a configuration panel 704 to configure settings associated with the format block 702. In particular, the configuration panel 704 shows that a user is able to select an output variable generated by an upstream custom code function block ("custom_function_1:custom_function.output") as a template parameter. Other types of function blocks can similarly use the visual playbook editor to refer to output variables of a custom code function block where relevant, thereby enabling a custom code function block and its attributes to be fully integrated into the visual representation of the playbook.

FIG. 17 is a flow diagram illustrating operations 1700 of a method for providing a visual playbook editor used to create playbooks for an OAR platform, the visual playbook editor including the ability to add custom code function blocks to a playbook, according to some embodiments. Some or all of the operations 1700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1700 are performed by an OAR platform 102 of the other figures.

The operations 1700 include, at block 1702, causing display of a GUI including a visual playbook editor for a playbook associated with an OAR platform, wherein the playbook is associated with computer program source code comprising a collection of related function blocks that define a series of operations to be performed in response to identification of an incident in an IT environment, and wherein the collection of related function blocks is represented by a graph displayed in a visual playbook editor. As illustrated in FIG. 5 and other figures, a visual playbook editor interface 500 can be used to display a visual representation of a playbook including a collection of related function blocks represented by a graph displayed in a visual playbook editor.

The operations 1700 further include, at block 1704, receiving input via the visual playbook editor, the input including: first input causing addition to the graph of a node representing a custom code function block, the custom code function block associated with user-generated source code to be executed as part of execution of the playbook, second input specifying one or more output variables associated with the custom code function block, and third input creating a connection between the node representing the custom code function block and at least one other node of the graph representing the playbook. For example, as illustrated in the example of FIG. 5, a user can use a function block selection panel 506 to cause addition to the graph of a node representing a custom code function block. As further illustrated in the example of FIG. 6, a custom code function block configuration panel 604 can be used to provide additional input specifying one or more output variables associated with the custom code function block, and the user can further use the visual playbook editor interface 600 to create connections between the node representing the custom code function block and other nodes of the graph representing the playbook.

In an embodiment, the operations further include determining that a user requesting addition of the custom code function block has sufficient permissions to add custom code to the playbook. For example, a visual playbook editor may be associated with user permissions that determine what types of operations certain users can perform on playbooks. In some cases, it may be desirable to limit some or all users' ability to add custom code to a playbook, for example, to enable simpler auditing of playbook functionality. In this example, a playbook editor can determine whether a user has sufficient permissions to add custom code to the playbook under development before enabling a custom code function block to be added to the playbook.

In an embodiment, the second input further includes one or more input parameters, and wherein at least one of the one or more input parameters is associated with a value generated by another function block of the playbook. Referring to FIG. 6, for example, a custom code function block configuration panel 604 enables users to specify one or more input parameters for the custom code function block, where the input parameters can be supplied by upstream blocks in the playbook and used during execution of the custom code function block.

In an embodiment, the input received via the visual playbook editor further includes fourth input specifying a custom variable name to be used to identify an output variable of the one or more output variables. Referring again to FIG. 6, for example, a user can use a custom code function block configuration panel 604 to configure custom variable names to identify output variables associated with a custom code function block. In an embodiment, the operations further include determining that a user requesting addition of the custom code function block has sufficient permissions to add custom code to the playbook.

In an embodiment, the third input defining the at least one connection between the custom code function block at the at least one other function block in the playbook includes input to the visual playbook editor creating a graphical edge between a first graphical representation of the custom code function block and a second graphical representation of the at least one other function block. Referring again to FIG. 7, for example, a user can use the visual playbook editor interface 700 to create a connection between a created custom code function block (not shown in FIG. 7) and the format block 702 by creating a graphical edge between the blocks, illustrated by the directed line connecting the blocks in the interface.

The operations 1700 further include, at block 1706, causing display of the node representing the custom code function block as part of the graph displayed in the visual playbook editor. In an embodiment, the custom code function block is displayed in the visual playbook editor using a graphical representation that indicates that the custom code function block represents user-generated custom code. Referring to FIG. 6, for example, the visual playbook editor interface 600 displays the custom code function block 602 using a particular visual representation indicating that the block represents user-generated code (for example, as indicated by the icon and block title "Custom Function"), thereby enabling users to readily identify portions of the playbook that contain custom code.

In an embodiment, at least one of the one or more output variables is used by another function block of the playbook. As illustrated by the example in FIG. 7, various types of downstream function blocks can be configured using a visual playbook editor and can refer directly to output variables generated by one or more upstream custom code function blocks.

In an embodiment, the operations further include receiving additional input causing the visual playbook editor to create a copy of the custom code function block in the playbook. Referring to FIG. 6, for example, a user can select a custom code function block 602 and provide input requesting to copy the function block such that the function block can be "pasted" at a different location in the playbook graph. A user can then optionally further configure the copied version of the function block as desired. In some embodiments, a user can create a copy of a custom code function block in a different playbook. In both cases, the creation of a copy of a custom code function block includes creating a code of the underlying source code and any associated settings (for example, defined input parameters and output variables).

In an embodiment, the user-generated source code includes a request that uses an API provided by the OAR platform. For example, a user can use a custom code editor to make API requests to modify container context or perform other operations supported by an OAR platform 102.

In an embodiment, the playbook is executed automatically in response to the OAR platform obtaining timestamped event data satisfying one or more criteria. For example, the OAR platform 102 may be configured to execute the playbook based on timestamped event data obtained from a data source such as a data intake and query system 120.

In an embodiment, the operations further include causing display of at least a portion of the user-generated source code in the visual playbook editor. Referring to FIG. 6, for example, a visual playbook editor interface 600 can display a code editor panel 610, which a user can use to modify the source code represented by a displayed custom code function block. In an embodiment, changes to the source code made by a user using a code editor panel 610 can be saved as part of the custom code function block (or optionally reverted if the user desires to undo the most recent changes made). In an embodiment, execution of the custom code function block includes generating output displayed in a debugger that is displayed as part of the visual playbook editor. For example, the output displayed in the debugger can be used to diagnose issues with a user's custom source code created as part of a custom code function block.

3.2. Multi-Prompt Blocks

As indicated elsewhere herein, a prompt block is generally used to add user interaction to playbooks by causing information to be requested from one or more users at a particular point during execution of the playbook. The information requested and consequently provided by a user can be used by other downstream codeblocks of the playbook. As an example, a playbook might include an action block that detects the presence of potentially malicious IP addresses, further include a connected prompt block that requests a yes/no response from a user indicating whether the IP address should be blocked, followed by another connected action block that either blocks the IP address at a firewall or not depending on input received from a user in response to the prompt block.

A visual playbook editor enables users to add prompt blocks that request a single item of information, as illustrated by the example above. Some decision points during the execution of playbooks, however, benefit from obtaining two or more items of information from a user. To continue the simple example provided above, it might be beneficial to obtain user input indicating whether the user desires for the IP address to be blocked and a duration of time for which the IP address is to be blocked. In these situations, users can attempt to create several connected prompt blocks to obtain the multiple items of information from users during playbook execution so that the information can be used by downstream function blocks. The display of such playbooks including chained prompt blocks in a visual playbook editor however quickly becomes unwieldy.

According to embodiments described herein, a visual playbook editor enables users to add "multi-prompt" function block to playbooks, where a multi-prompt function block can be configured to request two or more separate items of information in a single prompt. Among other benefits, a multi-prompt function block enables a more condensed and visually-intuitive visual playbook representation in instances where multiple items of information from a user are desired and further results in corresponding playbook source code that is more efficiently executed by an OAR platform 102 based on the more compact logic.

Figure 8:
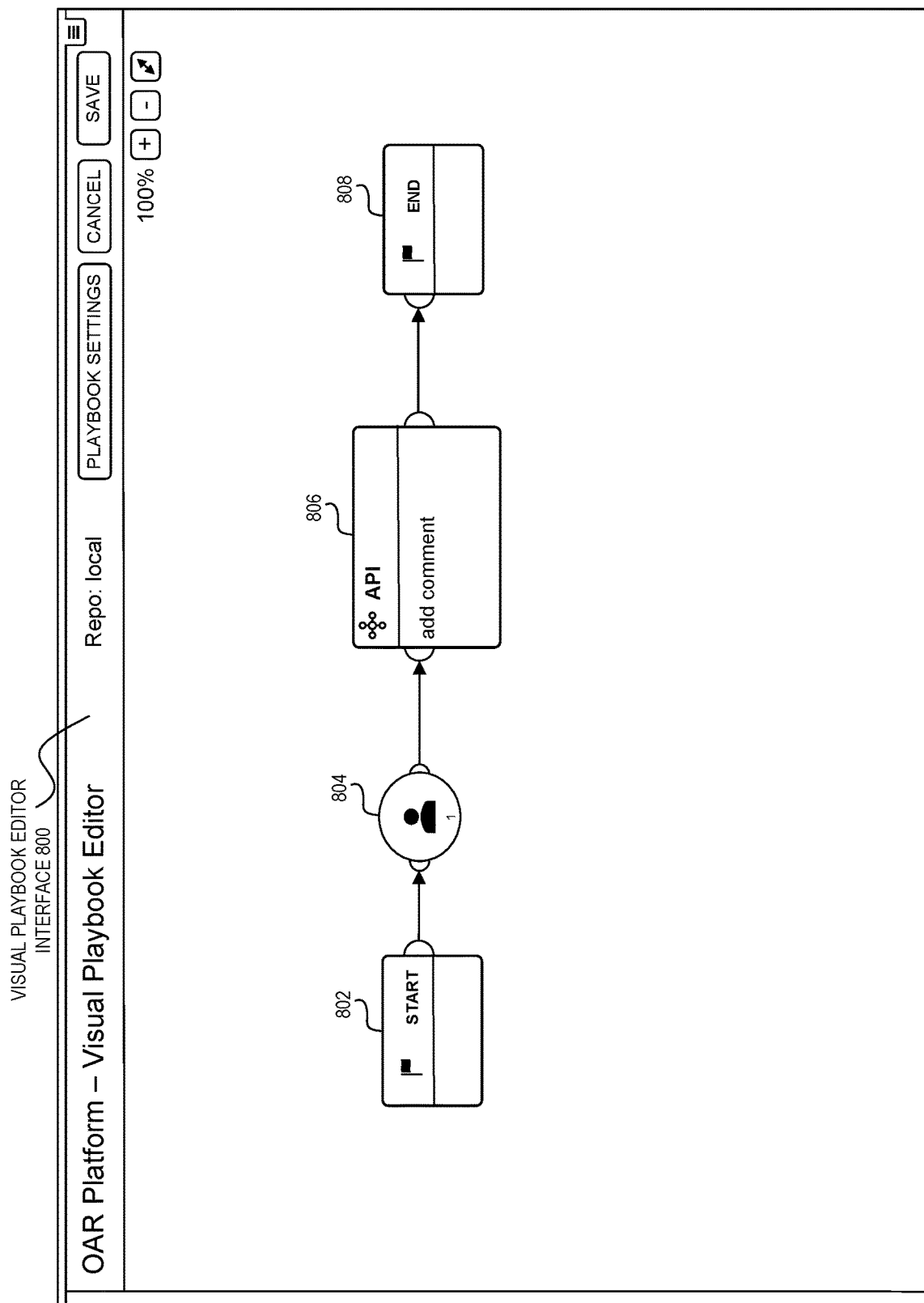
FIG. 8 illustrates an example of a playbook in a visual playbook editor including a multi-prompt block according to some embodiments.

FIG. 8 illustrates an example of a playbook in a visual playbook editor including a multi-prompt block according to some embodiments. As shown in FIG. 8, a visual playbook editor interface 800 includes a visually designed playbook currently including a start block 802, a multi-prompt block 804, an API block 806, and an end block 808. The multi-prompt block 804 may have been added to the playbook, for example, using a function block selection panel as illustrated above in FIG. 5. In this example, execution of the playbook proceeds by first executing the source code associated with the multi-prompt block 804, followed by execution of the source code associated with the API block 806. For example, the multi-prompt block 804 may be used to request two or more items of information from a user, some or all of which may be used by the API block 806 (for example, to add one or more of the items of information obtained by the multi-prompt block to an activity log or to perform other operations).

Figure 9:
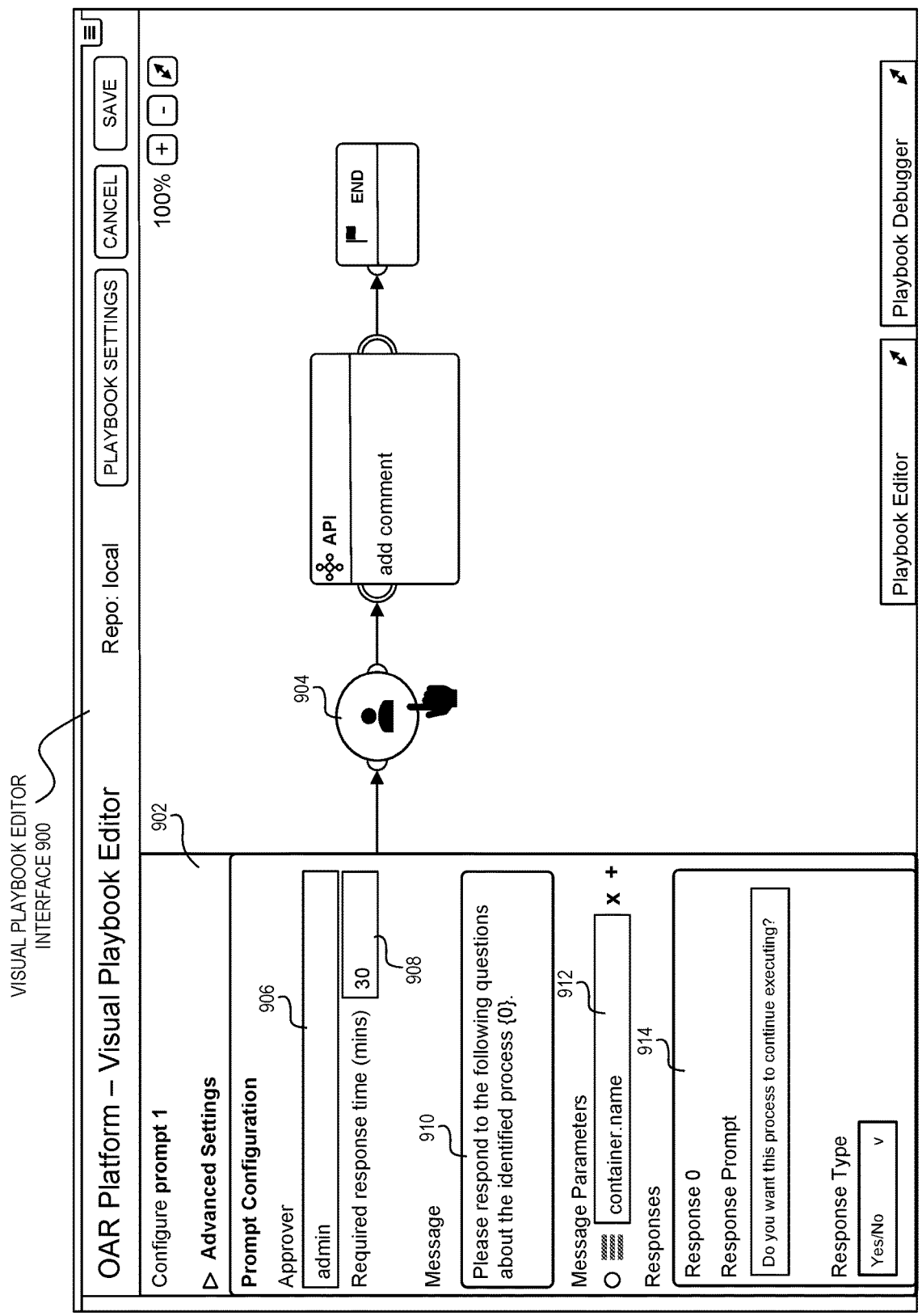
FIG. 9 illustrates an example of modifying a multi-prompt block added to a playbook using a visual playbook editor according to some embodiments.

FIG. 9 illustrates an example of modifying a multi-prompt block added to a playbook using a visual playbook editor according to some embodiments. As illustrated in FIG. 9, a visual playbook editor interface 900 displays a multi-prompt block configuration panel 902 used to configure properties associated with a multi-prompt block 904. The multi-prompt block configuration panel 902 includes, for example, an interface element 906 enabling a user to specify one or more approvers of the multi-prompt block, an interface element 908 enabling a user to specify a required response time, an interface element 910 that enables a user to specify a message prompt, an interface element 912 that enables a user to specify one or more message prompt parameters, and interface elements 914 that enable a user to specify one or more response prompts and response types.

As illustrated by the interface elements 914, a user can create a single multi-prompt block in a playbook and request any number of items of information from a user. Furthermore, each requested item of information can be associated with a separate response prompt, where each response prompt can be associated with a separate response type indicating an acceptable type of value that a user can respond with for that prompt. As indicated above, each of the values obtained from a user in response to a multi-prompt can be used by other blocks of the playbook either individually or in combination.

Figure 10:
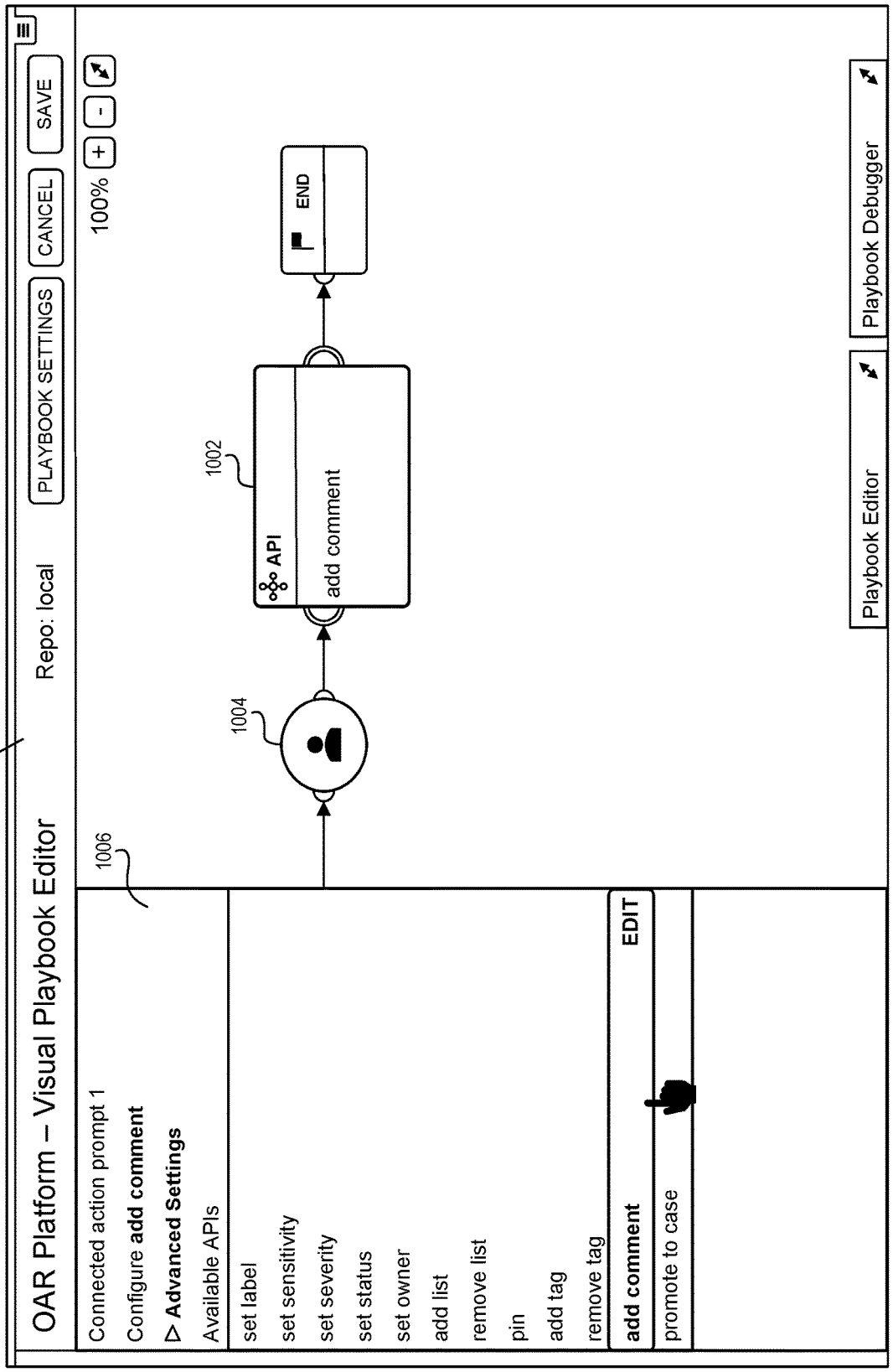
FIG. 10 illustrates an example of configuring a downstream block in a playbook to use an output variable of a multi-prompt block according to some embodiments.

FIG. 10 illustrates an example of configuring a downstream block in a playbook to use one or more output variables of a multi-prompt block according to some embodiments. As illustrated in FIG. 10, a visual playbook editor interface 1000 displays a playbook including an API block 1002 that is connected to a multi-prompt block 1004. In this example, because the API block 1002 is to be executed after execution of the multi-prompt block 1004, the API block 1002 is able to refer to and use output variables generated by the multi-prompt block 1004 including, for example, input received from a user that completes responses to some or all of the prompts included in the corresponding multi-prompt. The visual playbook editor interface 1000 in FIG. 10 further displays an API block configuration panel 1006, which enables users to configure attributes of the selected API block 1002. The API block configuration panel 1006 includes a list of available API requests that can be generated by the block including, for example, an API request to add a comment to an activity log associated with execution of the playbook of which the API block 1002 is a part.

Figure 11:
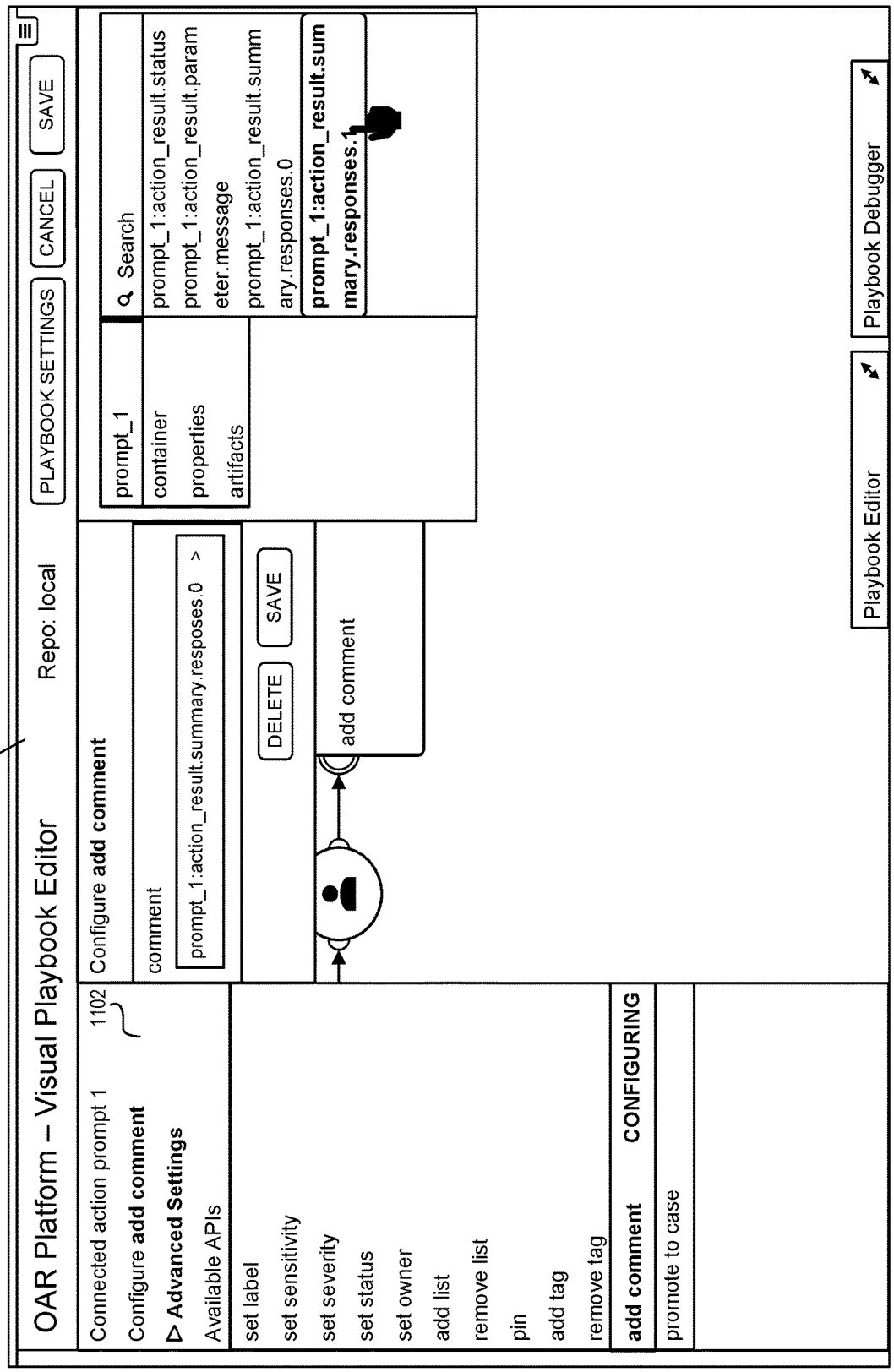
FIG. 11 further illustrates an example of modifying a downstream block in a playbook to use an output variable of a multi-prompt block according to some embodiments.

FIG. 11 illustrates a further example of modifying a block that is downstream from a multi-prompt block in a playbook according to some embodiments. Similar to FIG. 10, the visual playbook editor interface 1100 includes an API block configuration panel 1102 in which a user has selected an API request to add a comment to an activity log associated with execution of the playbook of which a corresponding API block is a part. In this example, a user is configuring the addition of a comment that includes a value obtained from an upstream multi-prompt block. As shown in the illustrated API block configuration panel 1102, a user is able to select from multiple separate output variables corresponding to answers obtained via a multi-prompt (for example, "prompt_1:action_result.summary.responses.0" or "prompt_1:action_result.summary.responses.1" corresponding to response to a first multi-prompt question and a second multi-prompt question, respectively).

FIG. 12 illustrates an example of a "mission control" interface used to view status information related to playbook executions according to some embodiments. The mission control interface 1200 shown in FIG. 12 includes, for example, an activity log panel 1202, a playbook execution status indicator 1204, and an approvals panel 1206. The approvals panel 1206, for example, displays to a user any pending or previously completed approvals generated based on execution of a playbook including one or more prompt blocks. As illustrated by the example playbook execution status indicator 1204, the currently executing playbook is awaiting user approval of a prompt included in the playbook, as also indicated in the approvals panel 1206. In the example shown in FIG. 12, to view a pending prompt generated based on execution of a playbook, a user can select the "MANAGE" button displayed in the approvals list to cause generation of a multi-prompt display including any number of requested items of data from the user depending on configuration of the corresponding multi-prompt block.

Figure 13:
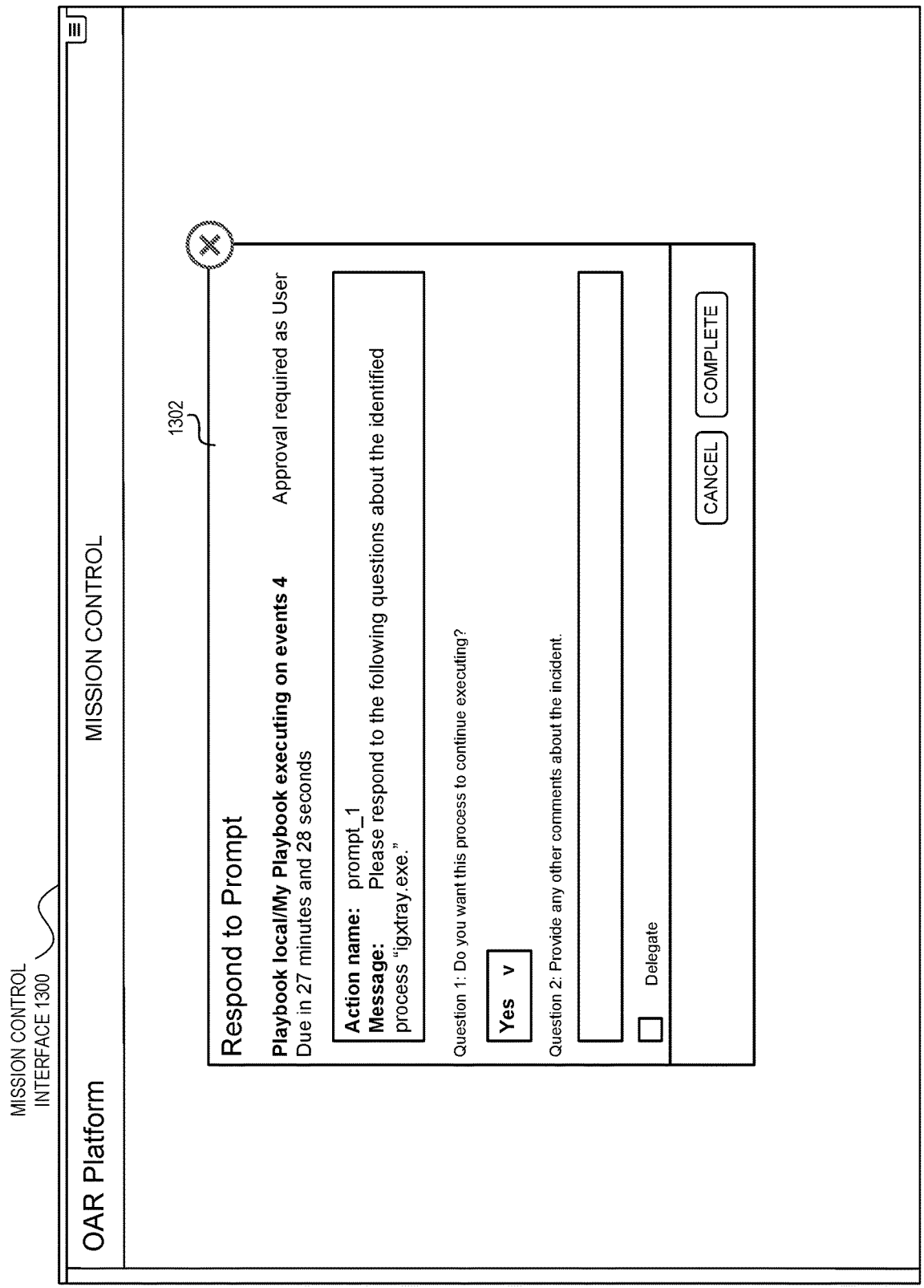
FIG. 13 illustrates an example of a multi-prompt interface element displayed to a recipient message according to some embodiments.

FIG. 13 illustrates an example of a mission control interface including display of a multi-prompt generated based on execution of playbook including a multi-prompt block according to some embodiments. As shown in FIG. 13, a multi-prompt display 1302 is displayed overlaying a mission control interface 1300. The multi-prompt display 1302 includes various displayed elements generated based on execution of the corresponding multi-prompt block including, for example, an indication of the playbook that caused generation of the multi-prompt, an indication of a container upon which the playbook is executing, an indication of a deadline for approving the multi-prompt, a general message associated with the multi-prompt, and any number of separate response prompts and response fields. In an embodiment, the type of response field displayed for each response prompt can depend on the corresponding configured type of acceptable response (for example, a text-field for a text or numerical response, a drop-down menu for a yes/no or enumerated list of acceptable responses, and the like).

FIG. 14 illustrates an example mission control interface after a user has successfully completed a multi-prompt according to some embodiments. In FIG. 14, the mission control interface 1400 includes an activity log panel 1402 displaying information related to execution of a playbook and, as shown in the example, the panel 1402 displays information in the activity stream indicating a response that a user provided as part of a multi-prompt (for example, the text string "The IP address has been blocked").

Figure 15:
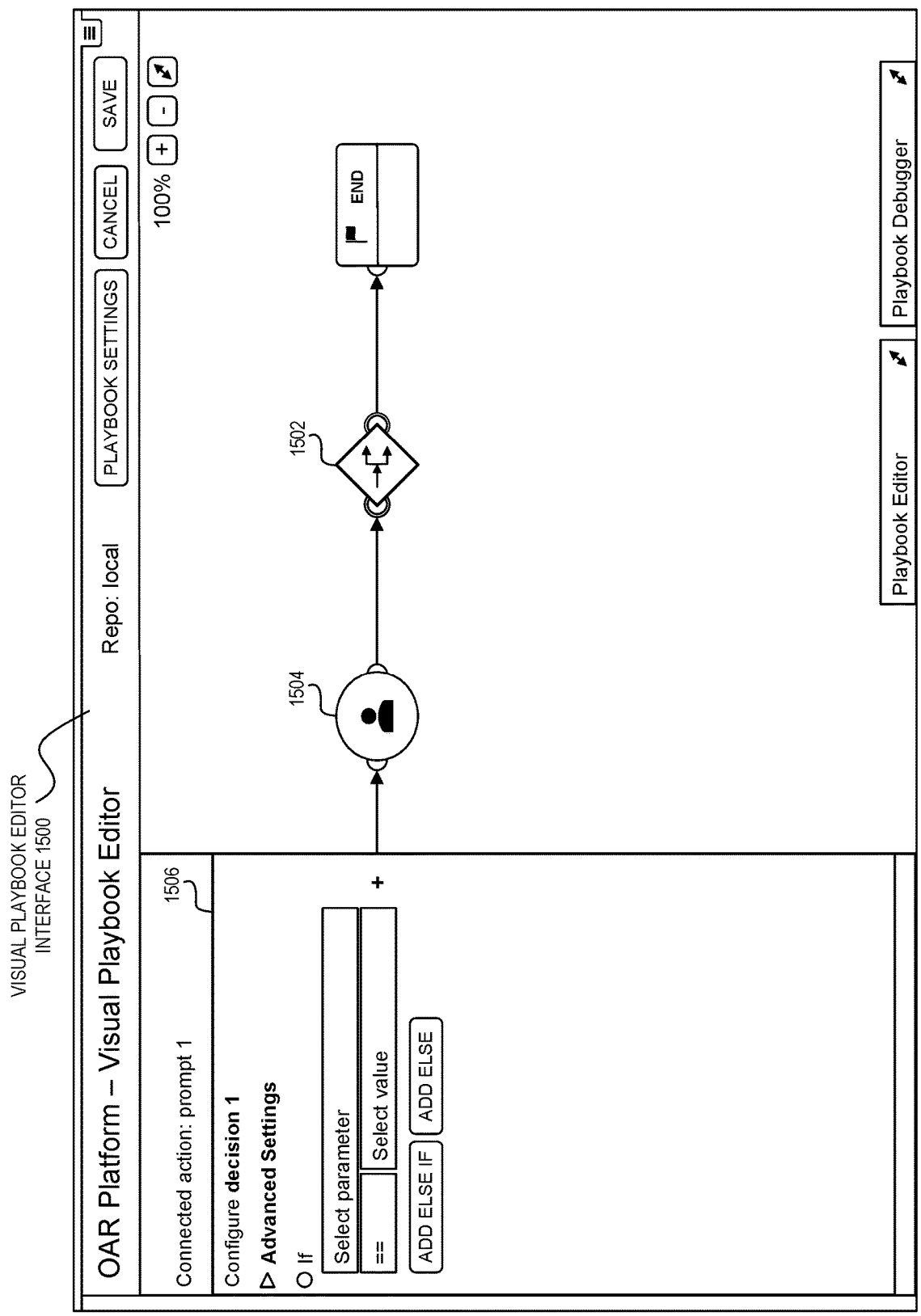
FIG. 15 illustrates an example of adding a decision block downstream from a multi-prompt block in a playbook using a visual playbook editor according to some embodiments.

As indicated above, the items of information obtained via a multi-prompt block during execution of a playbook can be used by downstream decision blocks. FIG. 15 illustrates an example of adding a decision block downstream from a multi-prompt block in a playbook using a visual playbook editor according to some embodiments. As shown in FIG. 15, a visual playbook editor interface 1500 includes a decision block 1502 that a user has added downstream from a multi-prompt block 1504. The visual playbook editor interface 1500 further displays a decision block configuration panel 1506, which a user can use to modify properties of the corresponding decision block 1502. As illustrated in FIG. 15, the configuration of a decision block can include adding any number of conditional statements which can be based on parameters obtained from upstream multi-prompt blocks and/or other blocks of the playbook. For example, a user might construct a condition statement indicating that if a user's response to a first multi-prompt question is true and if the user's response to a second multi-prompt is greater than 10, then proceed down one playbook execution path, otherwise proceed down a second playbook execution path, and the like.

Figure 16:
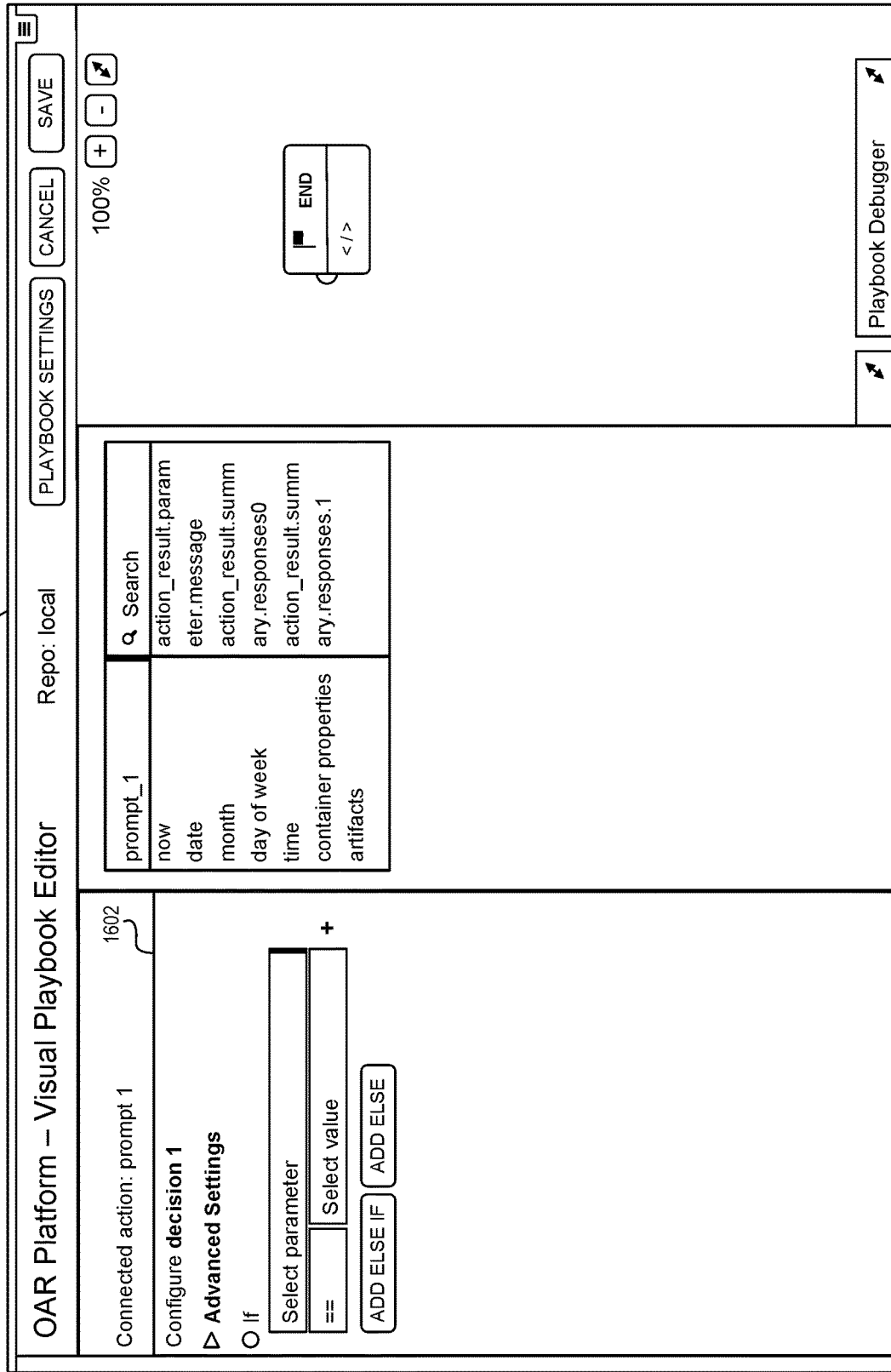
FIG. 16 illustrates an example of using multi-prompt output variables in a downstream decision block using a visual playbook editor according to some embodiments.

FIG. 16 illustrates an example of modifying a decision block using output variables associated with a multi-prompt block, as described above. FIG. 16 illustrates a visual playbook editor interface 1600 including a decision block configuration panel 1602, in which a user has provided input to select a parameter to be used as part of the conditional statement to be evaluated at the decision block. As illustrated by the decision block configuration panel 1602, the user is able to select from multiple different output variables generated by an upstream multi-prompt function block (for example, "action_result.summary.responses.0" and "action_result.summary.responses.1"), where one or more of the output variables from the upstream multi-prompt block can be used as part of the conditional statement defined by the decision block.

FIG. 18 is a flow diagram illustrating operations 1800 of a method for providing a visual playbook editor used to create playbooks for an OAR platform, the visual playbook editor including the ability to add multi-prompt function blocks to a playbook according to some embodiments. Some or all of the operations 1800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1800 are performed by an OAR platform 102 of the other figures.

The operations 1800 include, at block 1802, causing display of a GUI including a visual playbook editor for a customizable playbook associated with an OAR platform, wherein the customizable playbook represents computer program source code including a collection of related function blocks that define a series of operations to be performed in response to identification of an incident in an information technology (IT) environment, and wherein the collection of related function blocks is represented by a graph displayed in the visual playbook editor. As illustrated in FIG. 5 and other figures, a visual playbook editor interface 500 can be used to display a visual representation of a playbook including a collection of related function blocks represented by a graph displayed in a visual playbook editor.

The operations 1800 further include, at block 1804, receiving input via the visual playbook editor, the input including: first input causing addition to the graph of a node representing a multi-prompt function block to the playbook, the multi-prompt function block associated with a plurality of response prompts to be displayed to a user in a single interface element during execution of the playbook, wherein a value provided by a user in response to at least one of the plurality of response prompts is used by at least one other function block of the playbook, and second input defining at least one connection between the multi-prompt function block and at least one other function block in the playbook. Referring to FIG. 9, for example, a multi-prompt block configuration panel 902 can be used to configure various properties associated with a multi-prompt block added to a playbook, including the ability to add any number of response prompts to be displayed in a single interface element (for example, the interface element 1302 shown in FIG. 13 displaying a multi-prompt) during execution of the playbook. As further illustrated by FIG. 16, for example, the items of information provided by a user in response to a multi-prompt can be used by a variety of downstream block types.

The operations 1800 further include, at block 1806, causing display of the multi-prompt function block as part of the graph displayed in the visual playbook editor.

In an embodiment, the operations further include executing the playbook in response to identification of an incident in an IT environment, generating a multi-prompt interface element responsive to encountering the multi-prompt function block during execution of the playbook, and receiving a plurality of values from a user via the multi-prompt interface element. In an embodiment, the operations further include adding at least value of the plurality of values to an activity log associated with execution of the playbook. Referring to FIG. 13, for example, a multi-prompt display 1302 can be generated based on execution of a playbook including a multi-prompt block and, as illustrated in FIG. 14, the data items obtained from a multi-prompt block can be used in a variety of ways by downstream blocks including, for example, adding one or more multi-prompt responses to an activity log.

In an embodiment, the multi-prompt function block is connected to a decision block in the playbook, and wherein the decision block uses at least two values obtained via the multi-prompt function block to determine a playbook execution path of a plurality of possible playbook execution paths. As illustrated in FIG. 15, for example, a decision block configuration panel 1506 can be used to construct logical conditions for proceeding down various execution paths of the playbook, where a logical condition can include any combination of parameters including values obtained from an upstream multi-prompt block, if desired.

In an embodiment, at least one question displayed as part of a multi-prompt interface element generated based on the multi-prompt function block includes at least one dynamic component generated based on a value obtained from another function block of the playbook.

In an embodiment, the input received via the visual playbook editor further includes third input specifying a variable name to be used to identify a response value received from a user via a multi-prompt interface element generated based on execution of the multi-prompt function block.

In an embodiment, the input received via the visual playbook editor further includes third input indicating, for at least one question displayed as part of a multi-prompt interface element generated based on the multi-prompt function block, a type of acceptable response value to be provided by a user in response to the question. In an embodiment, the input received via the visual playbook editor further includes third input indicating, for a first question displayed as part of a multi-prompt generated based on the multi-prompt function block, a first type of acceptable response value to be provided by a user in response to the first question and, for a second question displayed as part of the multi-prompt interface element generated based on the multi-prompt function block, a second type of acceptable response value that is different from the first type of acceptable response value. In an embodiment, the input received via the visual playbook editor further includes third input indicating, for at least one question displayed as part of a multi-prompt interface element generated based on the multi-prompt function block, a range of acceptable response value to be provided by a user in response to the question.

In an embodiment, execution of the multi-prompt function block during execution of the playbook causes generation of a notification in a GUI indicating a request for a user to answer the plurality of response prompts. In an embodiment, execution of the multi-prompt function block during execution of the playbook causes execution of the playbook to be suspended until a user provides response values to the plurality of response prompts. In an embodiment, the input received via the visual playbook editor further includes third input indicating a deadline for a user to respond to a multi-prompt generated based on the multi-prompt function block during execution of the playbook. In an embodiment, execution of the multi-prompt function block during execution of the playbook includes causing display in a GUI of the single prompt including the plurality of response prompts and a plurality of interface elements used to provide response values for the plurality of response prompts.

In an embodiment, the playbook is executed automatically in response to the OAR platform obtaining time-stamped event data satisfying one or more criteria.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   causing display of a graphical user interface (GUI) including a visual playbook editor for editing a playbook, wherein the playbook represents computer program source code including a collection of related function blocks that define a series of operations to be performed in response to identification of an incident in an information technology (IT) environment, and wherein the collection of related function blocks is represented by a graph displayed in the visual playbook editor;
   receiving input via the visual playbook editor, the input including:
      first input causing addition, to the graph, of a node representing a custom code function block, wherein the custom code function block is represented by a graphical icon that visually indicates that the custom code function block is associated with user-generated source code to be executed as part of execution of the playbook,
      second input specifying one or more output variables associated with the custom code function block, and
      third input creating a connection between the node representing the custom code function block and at least one other node of the graph representing the playbook; and
   causing display of the node representing the custom code function block as part of the graph displayed in the visual playbook editor.

2. The computer-implemented method of claim 1, wherein at least one of the one or more output variables is used by another function block of the playbook.

3. The computer-implemented method of claim 1, wherein the playbook is executed automatically in response to an orchestration, automation, and response (OAR) platform obtaining timestamped event data satisfying one or more criteria.

4. The computer-implemented method of claim 1, wherein the input received via the visual playbook editor further includes fourth input specifying a custom variable name to be used to identify an output variable of the one or more output variables.

5. The computer-implemented method of claim 1, further comprising determining that a user requesting addition of the custom code function block has sufficient permissions to add custom code to the playbook.

6. The computer-implemented method of claim 1, wherein the second input further includes one or more input parameters, and wherein at least one of the one or more input parameters is associated with a value generated by another function block of the playbook.

7. The computer-implemented method of claim 1, wherein the third input defining the connection between the custom code function block and the at least one other node of the graph representing the playbook includes input to the visual playbook editor creating a graphical edge between a first graphical representation of the custom code function block and a second graphical representation of the at least one other node.

8. The computer-implemented method of claim 1, further comprising receiving additional input causing the visual playbook editor to create a copy of the custom code function block in the playbook.

9. The computer-implemented method of claim 1, further comprising receiving additional input causing the visual playbook editor to create a copy of the custom code function block in a different playbook.

10. The computer-implemented method of claim 1, wherein the user-generated source code includes a request that uses an application programming interface (API) provided by an orchestration, automation, and response (OAR) platform.

11. The computer-implemented method of claim 1, further comprising causing display of at least a portion of the user-generated source code in the visual playbook editor.

12. The computer-implemented method of claim 1, further comprising receiving, via the visual playbook editor, modifications to the user-generated source code, wherein the modifications to the user-generated source code are saved as part of the custom code function block.

13. The computer-implemented method of claim 1, wherein execution of the custom code function block includes generating output displayed in a debugger that is displayed as part of the visual playbook editor.

14. The computer-implemented method of claim 1, wherein the custom code function block is displayed in the visual playbook editor using a graphical representation that indicates that the custom code function block represents user-generated custom code.

15. The computer-implemented method of claim 1, wherein the playbook is associated with an orchestration, automation, and response (OAR) platform.

16. A non-transitory computer-readable storage medium storing instructions which, when executed by one or more processors, cause performance of operations comprising:
   causing display of a graphical user interface (GUI) including a visual playbook editor for editing a playbook, wherein the playbook represents computer program source code including a collection of related function blocks that define a series of operations to be performed in response to identification of an incident in an information technology (IT) environment, and wherein the collection of related function blocks is represented by a graph displayed in the visual playbook editor;

receiving input via the visual playbook editor, the input including:
  first input causing addition, to the graph, of a node representing a custom code function block, wherein the custom code function block is represented by a graphical icon that visually indicates that the custom code function block is associated with user-generated source code to be executed as part of execution of the playbook,
  second input specifying one or more output variables associated with the custom code function block, and
  third input creating a connection between the node representing the custom code function block and at least one other node of the graph representing the playbook; and causing display of the node representing the custom code function block as part of the graph displayed in the visual playbook editor.

17. The non-transitory computer-readable storage medium of claim 16, wherein at least one of the one or more output variables is used by another function block of the playbook.

18. The non-transitory computer-readable storage medium of claim 16, wherein the playbook is executed automatically in response to an orchestration, automation, and response (OAR) platform obtaining timestamped event data satisfying one or more criteria.

19. The non-transitory computer-readable storage medium of claim 16, wherein the input received via the visual playbook editor further includes fourth input specifying a custom variable name to be used to identify an output variable of the one or more output variables.

20. The non-transitory computer-readable storage medium of claim 16, wherein the instructions, when executed by the one or more processors, cause performance of operations further comprising: determining that a user requesting addition of the custom code function block has sufficient permissions to add custom code to the playbook.

21. The non-transitory computer-readable storage medium of claim 16, wherein the second input further includes one or more input parameters, and wherein at least one of the one or more input parameters is associated with a value generated by another function block of the playbook.

22. The non-transitory computer-readable storage medium of claim 16, wherein the third input defining the connection between the custom code function block and the at least one other node of the graph representing the playbook includes input to the visual playbook editor creating a graphical edge between a first graphical representation of the custom code function block and a second graphical representation of the at least one other node.

23. The non-transitory computer-readable storage medium of claim 16, wherein the playbook is associated with an orchestration, automation, and response (OAR) platform.

24. An apparatus, comprising:
one or more processors;
a non-transitory computer-readable storage medium storing instructions which, when executed by the one or more processors, causes the apparatus to:
  cause display of a graphical user interface (GUI) including a visual playbook editor for editing a playbook, wherein the playbook represents computer program source code including a collection of related function blocks that define a series of operations to be performed in response to identification of an incident in an information technology (IT) environment, and wherein the collection of related function blocks is represented by a graph displayed in the visual playbook editor;
  receive input via the visual playbook editor, the input including:
    first input causing addition, to the graph, of a node representing a custom code function block, wherein the custom code function block is represented by a graphical icon that visually indicates that the custom code function block is associated with user-generated source code to be executed as part of execution of the playbook,
    second input specifying one or more output variables associated with the custom code function block, and
    third input creating a connection between the node representing the custom code function block and at least one other node of the graph representing the playbook; and
  cause display of the node representing the custom code function block as part of the graph displayed in the visual playbook editor.

25. The apparatus of claim 24, wherein at least one of the one or more output variables is used by another function block of the playbook.

26. The apparatus of claim 24, wherein the playbook is executed automatically in response to the OAR platform obtaining timestamped event data satisfying one or more criteria.

27. The apparatus of claim 24, wherein the input received via the visual playbook editor further includes fourth input specifying a custom variable name to be used to identify an output variable of the one or more output variables.

28. The apparatus of claim 24, wherein the instructions, when executed by the one or more processors, further cause the apparatus to determine that a user requesting addition of the custom code function block has sufficient permissions to add custom code to the playbook.

29. The apparatus of claim 24, wherein the second input further includes one or more input parameters, and wherein at least one of the one or more input parameters is associated with a value generated by another function block of the playbook.

30. The apparatus of claim 24, wherein the playbook is associated with an orchestration, automation, and response (OAR) platform.

* * * * *